United States Patent
Guo et al.

(10) Patent No.: US 12,164,948 B2
(45) Date of Patent: Dec. 10, 2024

(54) PARTIALLY PRIVILEGED LIGHTWEIGHT VIRTUALIZATION ENVIRONMENTS

(71) Applicant: Microsoft Technology Licensing, LLC, Redmond, WA (US)

(72) Inventors: Amber Tianqi Guo, Seattle, WA (US); Frederick J. Smith, IV, Coeur d' Alene, ID (US); John Starks, Seattle, WA (US); Lars Reuther, Kirkland, WA (US); Deepu Thomas, Bellevue, WA (US); Hari R. Pulapaka, Redmond, WA (US); Benjamin M. Schultz, Bellevue, WA (US); Judy J. Liu, Mississauga (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 418 days.

(21) Appl. No.: 16/893,288

(22) Filed: Jun. 4, 2020

(65) Prior Publication Data
US 2021/0382739 A1 Dec. 9, 2021

(51) Int. Cl.
*G06F 9/455* (2018.01)
*G06F 9/54* (2006.01)
*G06F 21/53* (2013.01)

(52) U.S. Cl.
CPC .......... *G06F 9/45558* (2013.01); *G06F 9/545* (2013.01); *G06F 21/53* (2013.01); *G06F 2009/45562* (2013.01)

(58) Field of Classification Search
CPC ............... G06F 9/45558; G06F 9/545; G06F 2009/45562; G06F 2009/45587; G06F 21/53
See application file for complete search history.

(56) References Cited

U.S. PATENT DOCUMENTS

| 6,061,743 A | 5/2000 | Thatcher et al. |
| 6,950,964 B1 | 9/2005 | Mcmichael et al. |

(Continued)

FOREIGN PATENT DOCUMENTS

| CN | 101551756 A | * 10/2009 | |
| CN | 111078367 A | * 4/2020 | ......... G06F 9/45558 |

(Continued)

OTHER PUBLICATIONS

"International Search Report and Written Opinion Issued in PCT Application No. PCT/US21/025841", Mailed Date: Sep. 13, 2021, 14 Pages.

(Continued)

*Primary Examiner* — Qamrun Nahar
*Assistant Examiner* — Zhi Chen

(57) ABSTRACT

A fine-grain selectable partially privileged container virtual computing environment provides a vehicle by which processes that are directed to modifying specific aspects of a host computing environment can be delivered to, and executed upon, the host computing environment while simultaneously maintaining the advantageous and desirable protections and isolations between the remaining aspects of the host computing environment and the partially privileged container computing environment. Such partial privilege is provided based upon directly or indirectly delineated actions that are allowed to be undertaken on the host computing environment by processes executing within the partially privileged container virtual computing environment and actions which are not allowed. Aspects of the host computing environment operating system, such as the kernel, are extended to interface with container-centric mechanisms to receive information upon which actions can be allowed or denied by the kernel even if the process attempting such actions would otherwise have sufficient privilege.

20 Claims, 10 Drawing Sheets

(56) References Cited

U.S. PATENT DOCUMENTS

| | | | |
|---|---|---|---|
| 7,028,158 | B1 | 4/2006 | Beatty et al. |
| 7,496,565 | B2 | 2/2009 | Thind et al. |
| 7,584,219 | B2 | 9/2009 | Zybura et al. |
| 7,610,307 | B2 | 10/2009 | Havewala et al. |
| 7,783,677 | B2 | 8/2010 | Li et al. |
| 7,865,479 | B2 | 1/2011 | Gu et al. |
| 8,201,029 | B2 | 6/2012 | Jann et al. |
| 8,656,386 | B1 | 2/2014 | Tormasov et al. |
| 8,775,625 | B2 | 7/2014 | Narayanaswamy et al. |
| 8,874,888 | B1 | 10/2014 | Beda et al. |
| 8,903,705 | B2 | 12/2014 | Howell et al. |
| 9,123,092 | B2 | 9/2015 | Thakkar et al. |
| 9,244,674 | B2 | 1/2016 | Waterman et al. |
| 9,256,467 | B1 | 2/2016 | Singh et al. |
| 9,357,568 | B2 | 5/2016 | Al-shalash et al. |
| 9,424,267 | B2 | 8/2016 | Bagal et al. |
| 9,451,044 | B2 | 9/2016 | Nord et al. |
| 9,542,408 | B2 | 1/2017 | Moss et al. |
| 9,606,629 | B2 | 3/2017 | Binyamin et al. |
| 9,729,579 | B1* | 8/2017 | Marino ............ H04L 63/101 |
| 9,766,915 | B1 | 9/2017 | Emelyanov |
| 9,886,189 | B2 | 2/2018 | Zaveri et al. |
| 9,898,354 | B2 | 2/2018 | Engel et al. |
| 9,960,932 | B2 | 5/2018 | Constantinou |
| 9,965,151 | B2 | 5/2018 | Zaveri et al. |
| 9,971,977 | B2 | 5/2018 | Marti et al. |
| 10,061,613 | B1* | 8/2018 | Brooker .............. G06F 9/5005 |
| 10,140,461 | B2 | 11/2018 | Christiansen et al. |
| 10,169,209 | B2 | 1/2019 | Mcpherson et al. |
| 11,573,814 | B1 | 2/2023 | Aithal et al. |
| 2002/0095479 | A1 | 7/2002 | Schmidt et al. |
| 2004/0017395 | A1 | 1/2004 | Cook |
| 2004/0181579 | A1 | 9/2004 | Huck et al. |
| 2004/0210893 | A1* | 10/2004 | Chamberlain ............ G06F 8/65 |
| | | | 717/174 |
| 2005/0066059 | A1 | 3/2005 | Zybura et al. |
| 2005/0192984 | A1 | 9/2005 | Shenfield et al. |
| 2005/0198010 | A1 | 9/2005 | Borthakur et al. |
| 2005/0246723 | A1 | 11/2005 | Bhesania et al. |
| 2006/0010433 | A1 | 1/2006 | Neil et al. |
| 2006/0080656 | A1* | 4/2006 | Cain .................... G06F 8/65 |
| | | | 434/118 |
| 2007/0130229 | A1 | 6/2007 | Anglin et al. |
| 2007/0233709 | A1 | 10/2007 | Abnous et al. |
| 2008/0046708 | A1 | 2/2008 | Fitzgerald et al. |
| 2008/0091702 | A1 | 4/2008 | Pudipeddi et al. |
| 2008/0154985 | A1 | 6/2008 | Childs et al. |
| 2008/0301676 | A1* | 12/2008 | Alpern .................... G06F 8/65 |
| | | | 718/1 |
| 2009/0021513 | A1 | 1/2009 | Joshi et al. |
| 2009/0182778 | A1 | 7/2009 | Tormasov et al. |
| 2009/0328074 | A1* | 12/2009 | Oshins ............... G06F 9/45537 |
| | | | 719/321 |
| 2010/0036889 | A1 | 2/2010 | Joshi et al. |
| 2010/0043072 | A1 | 2/2010 | Rothwell |
| 2010/0235615 | A1 | 9/2010 | Manczak et al. |
| 2010/0262638 | A1 | 10/2010 | Fitzgerald |
| 2011/0055299 | A1 | 3/2011 | Phillips |
| 2011/0161649 | A1 | 6/2011 | Bert |
| 2011/0208929 | A1 | 8/2011 | Mccann |
| 2012/0005256 | A1 | 1/2012 | Cherukuri et al. |
| 2012/0180039 | A1 | 7/2012 | Bravery et al. |
| 2012/0204173 | A1 | 8/2012 | Liu |
| 2012/0233117 | A1 | 9/2012 | Holt et al. |
| 2012/0297181 | A1 | 11/2012 | Lee |
| 2012/0324236 | A1* | 12/2012 | Srivastava ............ H04L 9/3234 |
| | | | 713/189 |
| 2013/0024857 | A1 | 1/2013 | Yusupov |
| 2013/0057934 | A1 | 3/2013 | Satomi et al. |
| 2013/0191643 | A1 | 7/2013 | Song et al. |
| 2013/0226931 | A1 | 8/2013 | Hazel |
| 2014/0006465 | A1 | 1/2014 | Davis et al. |
| 2014/0033189 | A1 | 1/2014 | Buswell |
| 2014/0040331 | A1 | 2/2014 | Takaoka et al. |
| 2014/0053150 | A1 | 2/2014 | Barnett et al. |
| 2014/0095821 | A1 | 4/2014 | Yang et al. |
| 2014/0136865 | A1 | 5/2014 | Banerjee et al. |
| 2014/0157058 | A1* | 6/2014 | Bennah .................. G06F 11/079 |
| | | | 714/38.1 |
| 2014/0280392 | A1 | 9/2014 | Christiansen et al. |
| 2014/0280397 | A1 | 9/2014 | Rajpal et al. |
| 2014/0304313 | A1* | 10/2014 | Choi ..................... G06F 16/14 |
| | | | 707/827 |
| 2014/0324776 | A1 | 10/2014 | Novak et al. |
| 2015/0212842 | A1* | 7/2015 | Ghosh ................. G06F 9/45558 |
| | | | 718/1 |
| 2016/0072889 | A1 | 3/2016 | Jung et al. |
| 2016/0314010 | A1 | 10/2016 | Haque et al. |
| 2016/0335074 | A1 | 11/2016 | Olivier et al. |
| 2016/0378527 | A1* | 12/2016 | Zamir ................. G06F 9/45558 |
| | | | 711/162 |
| 2017/0124345 | A1 | 5/2017 | Christiansen et al. |
| 2017/0168936 | A1 | 6/2017 | Chandrashekar et al. |
| 2017/0220598 | A1 | 8/2017 | Lu et al. |
| 2017/0235507 | A1 | 8/2017 | Sinha et al. |
| 2017/0293491 | A1 | 10/2017 | Warkentin et al. |
| 2018/0060059 | A1 | 3/2018 | Wang et al. |
| 2018/0129666 | A1 | 5/2018 | Havewala et al. |
| 2018/0246710 | A1* | 8/2018 | Kim ..................... G06F 9/4406 |
| 2018/0270124 | A1* | 9/2018 | Chugtu ..................... G06F 8/60 |
| 2018/0285139 | A1 | 10/2018 | Shapira et al. |
| 2018/0307537 | A1 | 10/2018 | Chen et al. |
| 2018/0336123 | A1 | 11/2018 | Benes et al. |
| 2018/0341471 | A1 | 11/2018 | Stefanov et al. |
| 2018/0349150 | A1 | 12/2018 | Wong et al. |
| 2019/0042754 | A1 | 2/2019 | Jreij et al. |
| 2019/0180003 | A1* | 6/2019 | Schultz ............... G06F 16/1748 |
| 2019/0228087 | A1 | 7/2019 | Lee |
| 2019/0250926 | A1 | 8/2019 | Ravichandran et al. |
| 2019/0273655 | A1 | 9/2019 | Jones et al. |
| 2019/0310872 | A1 | 10/2019 | Griffin et al. |
| 2019/0354390 | A1* | 11/2019 | Gill ..................... G06F 3/0482 |
| 2020/0034449 | A1* | 1/2020 | Gupta ................. G06F 16/1748 |
| 2020/0065478 | A1* | 2/2020 | Rekhate ................ G06F 21/554 |
| 2020/0150974 | A1 | 5/2020 | Li et al. |
| 2020/0301616 | A1 | 9/2020 | Ciocari et al. |
| 2020/0334362 | A1* | 10/2020 | Stoler ................... G06F 21/577 |
| 2020/0341785 | A1* | 10/2020 | Tsirkin ................ G06F 9/45558 |
| 2021/0011740 | A1* | 1/2021 | Lu ......................... G06F 9/4881 |
| 2021/0141760 | A1 | 5/2021 | Li et al. |
| 2021/0182078 | A1 | 6/2021 | Rietschin et al. |
| 2022/0138146 | A1 | 5/2022 | Chagani et al. |
| 2022/0334848 | A1 | 10/2022 | Rietschin et al. |

FOREIGN PATENT DOCUMENTS

| | | |
|---|---|---|
| EP | 1845444 A1 | 10/2007 |
| WO | 2010125473 A1 | 11/2010 |
| WO | 2011022388 A1 | 2/2011 |
| WO | 2014202403 A1 | 12/2014 |
| WO | 2015088374 A1 | 6/2015 |

OTHER PUBLICATIONS

Merkel, Dirk, "Docker: Lightweight Linux Containers for Consistent Development and Deployment", In Linux Journal, vol. 2014, Issue 239, Mar. 1, 2014, pp. 76-91.

"Invitation To Pay Additional Fees issued in PCT Application No. PCT/US21/025841", Mailed Date: Jul. 21, 2021, 9 Pages.

Zhang, et al., "Harbormaster: Policy Enforcement for Containers", In Proceedings of the IEEE 7th International Conference on Cloud Computing Technology and Science, Nov. 30, 2015, pp. 355-362.

Non-Final Office Action mailed on Mar. 5, 2024, in U.S. Appl. No. 17/084,238, 35 pages.

"About Docker", Retrieved from: https://web.archive.org/web/20190518062328/https://docs.cancergenomicscloud.org/docs/docker-basics, May 18, 2019, 4 Pages.

"Docker and AUFS in Practice", Retrieved from: https://web.archive.org/web/20160305021439/https://docs.docker.com/engine/userguide/storagedriver/aufs-driver/, Mar. 5, 2016, 15 Pages.

(56) References Cited

OTHER PUBLICATIONS

"Docker and OverlayFS Storage in Practice", Retrieved From: https://web.archive.org/web/20160305024221/https://docs.docker.com/engine/userguide/storagedriver/overlayfs-driver/, Mar. 5, 2016, 17 Pages.

"Understand Images, Containers, and Storage Drivers", Retrieved from: https://web.archive.org/web/20161023201951/https://docs.docker.com/engine/userguide/storagedriver/imagesandcontainers/, May 23, 2017, 22 Pages.

"Understand the Architecture", Retrieved From: https://web.archive.org/web/20151107020152/http://docs.docker.com:80/engine/introduction/understanding-docker/, Nov. 7, 2015, 14 Pages.

"Final Office Action Issued in U.S. Appl. No. 15/074,273", Mailed Date: Jun. 18, 2018, 10 Pages.

"Non Final Office Action Issued in U.S. Appl. No. 15/074,273", Mailed Date: Dec. 27, 2017, 11 Pages.

"Notice of Allowance Issued in U.S. Appl. No. 15/074,273", Mailed Date: Aug. 15, 2018, 9 Pages.

"Final Office Action Issued in U.S. Appl. No. 15/076,277", Mailed Date: Apr. 20, 2017, 22 Pages.

"Non Final Office Action Issued in U.S. Appl. No. 15/076,277", Mailed Date: Oct. 6, 2016, 19 Pages.

"Notice of Allowance Issued in U.S. Appl. No. 15/076,277", Mailed Date: Oct. 20, 2017, 16 Pages.

"Final Office Action Issued in U.S. Appl. No. 15/629,301", Mailed Date: Oct. 2, 2019, 24 Pages.

"Non Final Office Action Issued in U.S. Appl. No. 15/629,301", Mailed Date: Jun. 23, 2020, 25 Pages.

"Non Final Office Action Issued in U.S. Appl. No. 15/629,301", Mailed Date: Jul. 1, 2019, 20 Pages.

"Notice of Allowance Issued in U.S. Appl. No. 16/716,467", Mailed Date: Jan. 18, 2022, 12 Pages.

"Office Action Issued In European Patent Application No. 16801068.4", Mailed Date: Oct. 29, 2019, 4 Pages.

"Final Office Action Issued in U.S. Appl. No. 17/084,238", Mailed Date: May 11, 2023, 32 Pages.

"Non Final Office Action Issued in U.S. Appl. No. 17/084,238", Mailed Date: Oct. 27, 2022, 32 Pages.

"Non Final Office Action Issued in U.S. Appl. No. 17/724,356", Mailed Date : Apr. 5, 2023, 19 Pages.

"Notice of Allowance Issued in U.S. Appl. No. 17/724,356", Mailed Date: Oct. 23, 2023, 5 Pages "Office Action Issued In European Patent Application No. 17798048.9", Mailed Date: Jun. 23, 2021, 8 Pages.

"Office Action and Search Report Issued in Chinese Patent Application No. 201680063205.1", Mailed Date: Jun. 24, 2021, 16 Pages.

"Office Action Issued in Chinese Patent Application No. 201680063205.1", Mailed Date: Jun. 2, 2022, 10 Pages.

"Office Action Issued in Chinese Patent Application No. 201680063205.1", Mailed Date: Mar. 2, 2022, 12 Pages.

Anderson, et al., "Global Namespace for Files", In IBM Systems Journal, vol. 43, Issue 4, Apr. 6, 2004, pp. 702-722.

Arredondo, J.R., "Rackspace Cloud Databases and Container-based Virtualization", Retrieved from: https://web.archive.org/web/20120901030519/http://c1776742.r42.cf0.rackcdn.com/downloads/pdfs/Rackspace-Cloud-Databases-and-Container-based-Virtualization.pdf, Aug. 2012, 6 Pages.

Cheng, Sarahx. , "A Method of Merging VMware Disk Images through File System Unification", In Thesis Submitted to the Department of Electrical Engineering and Computer Science, Massachusetts Institute of Technology, Feb. 2011, 67 Pages.

Choudhari, et al., "Docker-Run, Ship and building Applications", In International Journal of Latest Trends in Engineering and Technology, vol. 6, Issue 2, Nov. 2015, 7 Pages.

Felter, et al., "An Updated Performance Comparison of Virtual Machines and Linux Containers", Retrieved from: http://course.ece.cmu.edu/~ece845/docs/containers.pdf, Jul. 21, 2014, 12 Pages.

Hall, Susan, "Rise of the Container-Focused Operating Systems", Retrieved from: https://thenewstack.io/docker-fuels-rethinking-operating-system/, Jan. 27, 2016, 8 Pages.

Lu, et al., "Physical Disentanglement in a Container-Based File System", In Proceedings of the 11th USENIX Symposium on Operating Systems Design and Implementation, Oct. 6, 2014, 16 Pages.

"International Search Report and Written Opinion Issued in PCT Application No. PCT/US17/022227", Mailed Date: May 29, 2017, 11 Pages.

"International Preliminary Report on Patentability Issued in PCT Application No. PCT/US2016/058420", Mailed Date: Jan. 29, 2018, 7 Pages.

"International Search Report and Written Opinion Issued in PCT Application No. PCT/US2016/058420", Mailed Date: Feb. 22, 2017, 10 Pages.

"Second Written Opinion Issued in PCT Application No. PCT/US2016/058420", Mailed Date: Jul. 10, 2017, 6 Pages.

"International Search Report and Written Opinion Issued in PCT Application No. PCT/US2017/058922", Mailed date: Feb. 2, 2018, 12 Pages.

"International Search Report and Written Opinion Issued in PCT Application No. PCT/US2020/059916", Mailed Date: Feb. 24, 2021, 12 Pages.

"International Search Report and Written Opinion Issued in PCT Application No. PCT/US2021/043812", Mailed Date: Nov. 4, 2021, 10 Pages.

Porter, et al., "Rethinking the Library OS from the Top Down", In Proceedings of the Sixteenth International Conference on Architectural Support for Programming Languages and Operating Systems, Mar. 5, 2011, pp. 291-304.

Soltesz, et al., "Container-based Operating System Virtualization: A Scalable, High-performance Alternative to Hypervisors", In Proceedings of the 2nd ACM SIGOPS/EuroSys European Conference on Computer Systems, Mar. 21, 2007, 13 Pages.

Zheng, et al., "Wharf: Sharing Docker Images in a Distributed File System", In Proceedings of the ACM Symposium on Cloud Computing, Oct. 11, 2018, 12 Pages.

Communication pursuant to Article 94(3) EPC Received for European Application No. 21758895.3, mailed on Jun. 25, 2024, 04 pages.

Communication pursuant to Article 94(3) EPC Received for European Application No. 21722618.2, mailed on Oct. 14, 2024, 07 pages.

Communication under Rule 71(3) Received in European Patent Application No. 20819988.5, mailed on Aug. 1, 2024, 08 pages.

\* cited by examiner

PARTIALLY PRIVILEGED LIGHTWEIGHT VIRTUALIZATION ENVIRONMENTS

BACKGROUND

Traditional virtual computing environments, commonly termed "virtual machines", virtualize most or all aspects of a computing environment, and can, thereby, present computing environments that are very different from the host computing device hardware and operating system. Such virtual machine computing environments can virtualize the computing hardware itself. However, traditional virtual computing environments, because of the need to virtualize most or all aspects of the hardware of the host computing environment, can consume large quantities of memory, require extensive processing resources, and can otherwise be inefficient. In some instances, lightweight virtual computing environments, often termed "containers", can provide many of the isolation benefits of traditional virtual computing environments in a more efficient manner, such as by utilizing aspects of the host computing device hardware and operating system, instead of virtualizing those aspects of the computing environment. Such container virtual computing environments can virtualize only portions of a computing environment, such as just the file system, thereby presenting a different, isolated view of file data. As such, containers can be utilized to provide isolated computing environment, such as to limit the impact of potentially malicious instructions, provide virgin computing environment, such as for testing or troubleshooting purposes, and other like benefits.

In some instances, it can be desirable to allow processes executing within a container virtual computing environment to persist changes directly onto a host computing environment. For example, a container virtual computing environment can utilize aspects of a host computing environment's operating system, such as its printer drivers. Processes executing within one container virtual computing environment could install a new printer driver within such a container virtual computing environment, but since, traditionally, such changes would only be made within the container virtual computing environment itself, and would not impact the host computing environment, processes executing within other virtual computing environments, or in the host computing environment itself, would not have access to such a new printer driver. Privileged containers can be provided with access to the underlying host computing environment.

Unfortunately, privileged containers have access to the entire host computing environment and, thereby, defeat many of the protection and isolation advantages of non-privileged, traditional containers.

SUMMARY

A fine-grain selectable partially privileged container virtual computing environment provides a vehicle by which processes that are directed to modifying specific aspects of a host computing environment can be delivered to, and executed upon, the host computing environment while simultaneously maintaining the advantageous and desirable protections and isolations between the remaining aspects of the host computing environment and the partially privileged container computing environment. Such partial privilege is provided based upon directly or indirectly delineated actions that are allowed to be undertaken on the host computing environment by processes executing within the partially privileged container virtual computing environment and actions which are not allowed. Aspects of the host computing environment operating system, such as the kernel, are extended to interface with container-centric mechanisms to receive information upon which actions can be allowed or denied by the kernel even if the process attempting such actions would otherwise have sufficient privilege. Prevented actions are, instead, performed within the context of the container virtual computing environment in overlays that can be recorded in a sandbox on the host computing environment in accordance with traditional container virtual computing environment methodologies.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
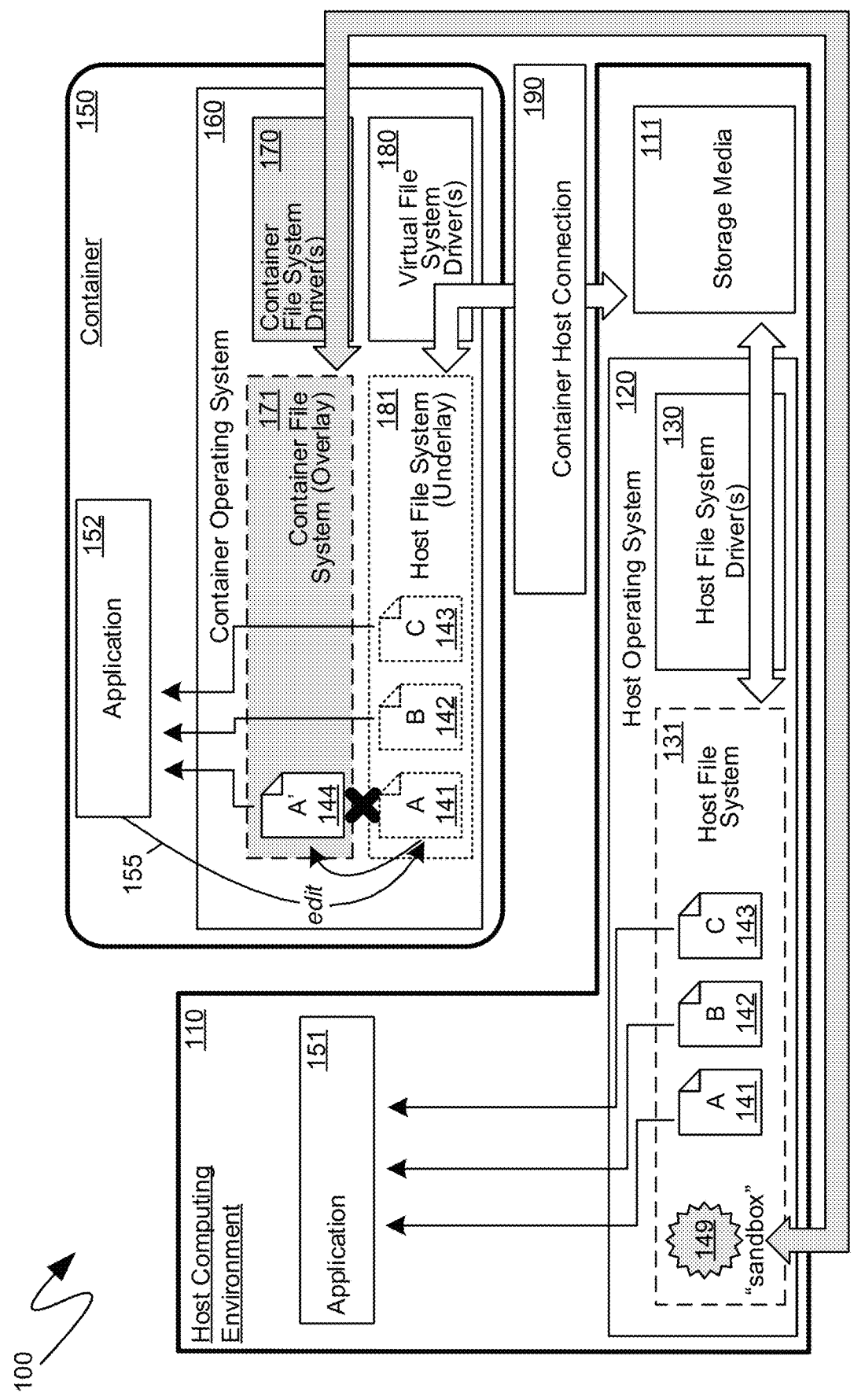
FIG. 1 is a system diagram of an exemplary nonprivileged container virtual computing environment.

The following description relates to fine-grain selectable partially privileged container virtual computing environments, which enable mechanisms by which processes that are directed to modifying specific aspects of a host computing environment can be delivered to, and executed upon, the host computing environment while simultaneously maintaining the advantageous and desirable protections and isolations between the remaining aspects of the host computing environment and the partially privileged container computing environment. Such partial privilege is provided based upon directly or indirectly delineated actions that are allowed to be undertaken on the host computing environment by processes executing within the partially privileged container virtual computing environment and actions which are not allowed. Aspects of the host computing environment operating system, such as the kernel, are extended to interface with container-centric mechanisms to receive information upon which actions can be allowed or denied by the kernel even if the process attempting such actions would otherwise have sufficient privilege. Prevented actions are, instead, performed within the context of the container virtual computing environment in overlays that can be recorded in a sandbox on the host computing environment in accordance with traditional container virtual computing environment methodologies.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environment where tasks are performed by remote processing devices that are linked through a communications network. In a distributed computing environment, program modules may be located in both local and remote memory storage devices.

To provide relevant context for the descriptions further below, unprivileged and privileged virtualized computing environments are described. While the descriptions herein are primarily made with reference to filesystem virtualiztion, the virtualized computing environment implementations may extend to many other aspects of computing environments, such as access to computing environment settings, registry databases, control of executing processes and other like aspects. The descriptions below detail partially privileged container virtual computing environments According to one aspect, such partial privilege is implemented in a database, such as a registry, in which only certain registry keys, or other like database entries, of the host computing environment may be impacted by processes executing within a virtual computing environment using the same methods as those detailed below. According to another aspect, such partial privilege is implemented as a network firewall policy to only provide privilege and/or access to certain network endpoints of the host computing environment from within the virtual computing environment. Network virtualization may include actions such as send, receive, modify, forward and so forth, in addition to the read/write actions detailed below. According to yet another aspect, an application in the virtual computing environment may require a license check on the host computing environment and may be granted only partial access to the licensing store and/or database on the host computing environment, with such partial access being dependent on partial privilege.

With reference to FIG. 1, an exemplary system 100 is illustrated, providing context for the descriptions below. The exemplary system 100 comprises an exemplary host computing environment 110, which, for purposes of providing context for the descriptions below, hosts a virtualized computing environment in the form of the exemplary container 150. As utilized herein, the term "virtualized computing environment" means a virtualized computing environment that does not virtualize the underlying host computing hardware or devices, but rather virtualizes the file system and/or other operating system properties, settings, extensions, registries, or the like, thereby providing isolation between the host computing environment and the virtualized computing environment such that changes made within the virtualized computing environment do not analogously change the host computing environment.

For example, and as illustrated by the exemplary system 100 of FIG. 1, the exemplary host computing environment 110 has executing thereon a host operating system, such as in the form of the exemplary host operating system 120. As part of the host operating system 120, one or more file system drivers, filters, mini-filters, and other like file system components, generally illustrated in FIG. 1 as the host file system drivers 130, obtain data in structured form from one or more storage media, such as the exemplary storage media 111, and parse such data into file constructs that can be presented to applications and other processes executing on the host operating system 120. For example, an application 151, executing on the host computing environment 110 can be presented with multiple files, such as the exemplary files 141, 142 and 143, as part of the host file system 131. Analogously, a container operating system, such as the exemplary container operating system 160, is executed within the exemplary container 150. To provide file system virtualization, however, the exemplary container operating system 160 can present different files then the host file system 131.

According to one aspect, the file system of the exemplary container operating system 160 is a layered file system that can enable applications executing within the container environment 150, such as the exemplary application 152, to access some or all of the same files of the host file system 131, such as, for example, the exemplary files 141, 142 and 143, except that any changes or modifications to those files remain only within the container environment 150. For example, as illustrated by the exemplary system 100 of FIG. 1, the exemplary container operating system 160 comprises a layered file system in the form of the container file system 171, which acts as a primary layer, or "overlay", in combination with the host file system 181, which acts as a secondary layer, or "underlay".

The file systems referenced herein can be any of the known, existing file systems, such as the NT file system (NTFS), the Apple file system (APFS), the UNIX file system (UFS), and the like, or other file systems. Similarly, the file system drivers can be the corresponding drivers, filters, mini-filters, and other like drivers that can implement such file systems. Thus, for example, if the host file system 131 is NTFS, then the host file system drivers 130 are the relevant NTFS drivers. Within the exemplary container environment 150, however, the host file system 181 is implemented in a slightly different manner so as to provide access to the host file system from within a virtualized computing environment. More specifically, according to one aspect, access to the host computing environment 110, from within the container environment 150, is through a container host connection, such as the exemplary container host connection 190. According to one aspect, the exemplary container host connection 190 is in the form of a virtualized network connection which simulates the container environment 150 being a separate computing device from the host computing environment 110, and the two computing devices being communicationally coupled via a network. Other container host connections can be based on other communication protocols, such as peripheral interconnection protocols and the like. According to one aspect, the container host connection 190 appears as a block data device from within the container environment 150. Accordingly, the host file system 181, from within the container environment 150, is implemented as a network file system, for example, and, accordingly, the drivers 180, which can include drivers, filters, mini-filters and other like constructs, implement such a network file system by communicating, through the container host connection 190, with the host computing environment 110. The host computing environment 110 also comprises a file system having a same type as the host file system 131. For example, if the host file system 131 is NTFS, the container file system 171 is also NTFS. In such an instance, the container file system drivers 170 comprise analogous drivers, filters, mini-filters and other like constructs to those of the host file system drivers 130. Indeed, the same codebase, or even the same compiled binaries, can be utilized to implement both the container file system drivers 170 and the host file system drivers 130.

According to one aspect, changes to files within the file system virtualization environment presented by the container 150 are isolated from other file system virtualization environments and from the host computing environment 110 itself. For example, if the exemplary application 152, executing within the container environment 150, were to edit the exemplary file 141, as illustrated by the edit action 155, such a modification can result in a file 144, representing an edited version of the file 141, being part of the container file system 171. The original file 141 would be unchanged. However, from within the container environment 150, the layered file system would present the edited file 144 instead of the original file 141 from the host file system. Colloquially, the edited file 144 would "block" or "mask" the presentation of the original file 141. If the exemplary application 152 did not edit the files 142 or 143, those files would still "pass through" the overlay file system and be presented to applications or processes executing within the container 150, such as the exemplary application 152.

The digital data representing edited file 144 can be stored in a sandbox, such as the exemplary sandbox 149, which can be accessed by the container file system drivers 170, described previously, in order to generate the container file system 171. As utilized herein, the term "sandbox" means one or more files, databases, structured storage, or other like digital data repository that store the relevant data that is accessible only from within the isolated container virtual computing environment 150. For example, the sandbox 149 can be a file, or a package, within the host file system 131. In such a manner, the host computing environment 110 remains isolated from edits performed within the container environment 150. Thus, for example, if the edit 155 was a malicious action, the file 141 in the host computing environment 110 would remain isolated from, and unaffected by, such an action within the container environment 150.

In a similar manner, files installed or created by the application 152 are also stored or installed as part of the container file system 171. Thus, for example, if the application 152 were to install a preferences file, such a preferences file would be stored as part of the container file system 171, and would, thereby, be accessible to the application 152 executing within the container virtual computing environment 150. However, the data of such a preferences file would, to the host computing environment 110, simply increase the size of the sandbox 149, and would not be visible, such as to the application 151 executing within the context of the host computing environment 110. Accordingly, the configuration of the application 152 would be limited to the container virtual computing environment 150.

As indicated, in some instances, it can be desirable to allow processes executing within the container environment 150 to modify aspects of the underlying host computing environment 110, including the ability to modify existing files, install new files, change settings, such as a current time, install or remove drivers, mini-filters, firmware or other like aspects of the underlying host computing environment 110. In such instances, a privileged container virtual computing environment can be utilized.

Figure 2:
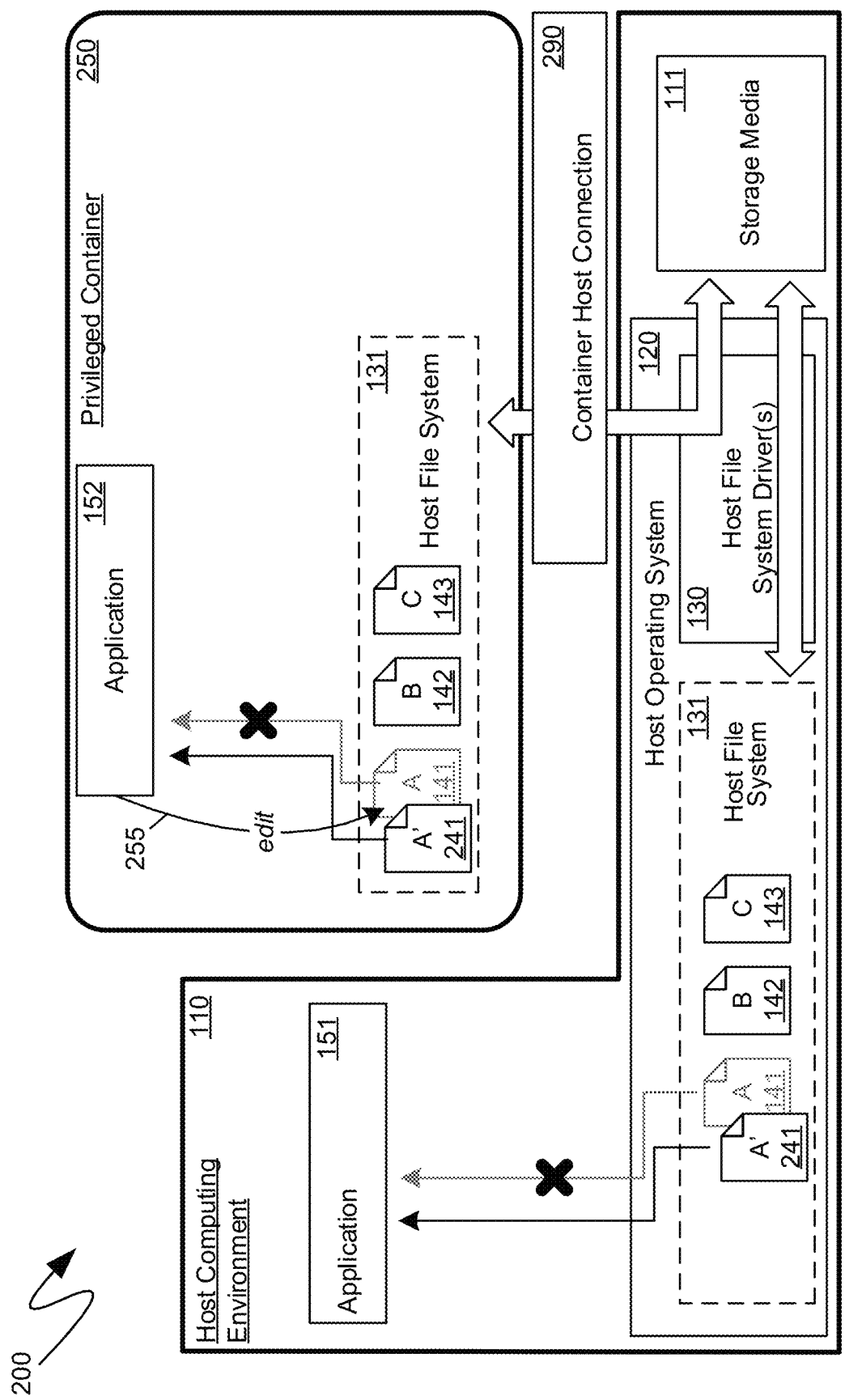
FIG. 2 is a system diagram of an exemplary privileged container virtual computing environment.

Turning to FIG. 2, the exemplary system 200 shown therein illustrates a known privileged container in the form of the exemplary privileged container virtual computing environment 250. As can be seen, processes executing within a privileged container, such as the exemplary application 152, can directly access, modify, delete, and otherwise affect aspects of the underlying host computing environment 110. More specifically, in the exemplary system 200, the container host connection is in the form of an exemplary container host connection 290 which can be a simpler connection than the previously described container host connection 190. For example, the exemplary container host connection 290 does not simulate a remote networking relationship between the privileged container computing environment 250 and the host computing environment 110. Instead, processes executing within the privileged container 250 are provided access to the host file system 131, such as by utilizing the same host filesystem drivers 130. In such a manner, modifications by the application 152, such as the edit of the file 141 to create a new version 241, impact the host computing environment 110 as well, since both the application 151, executing within the host computing environment 110, and the application 152, executing within the privileged container computing environments 250, have access to the same underlying host file system 131. As such, a modification of the file 141 to create a new file 241 results in the application 151 also no longer being able to access the prior version 141, and, instead, only being allowed to access the new version 241.

While the exemplary system 200 shown in FIG. 2 illustrates a modification of a file by a process executing within a privileged container virtual computing environment 250, processes executing within the privileged container 250 can, in an analogous manner, modify other aspects of the host operating system 120 including, for example, installing, updating or removing drivers, mini-filters, firmware, and other like aspects of the host operating system 120. Additionally, processes executing within the privilege container 250 can change the system time, various operating system preferences and other like aspects of the host operating system 120. While individual ones of such actions can be desirable to allow to be performed by processes executing within container virtual computing environments, the existing state-of-the-art forces a Hobson's choice of either not being able to perform any such privileged actions, or of allowing processes executing within privileged container virtual computing environments the ability to perform all such privileged actions.

Figure 3:
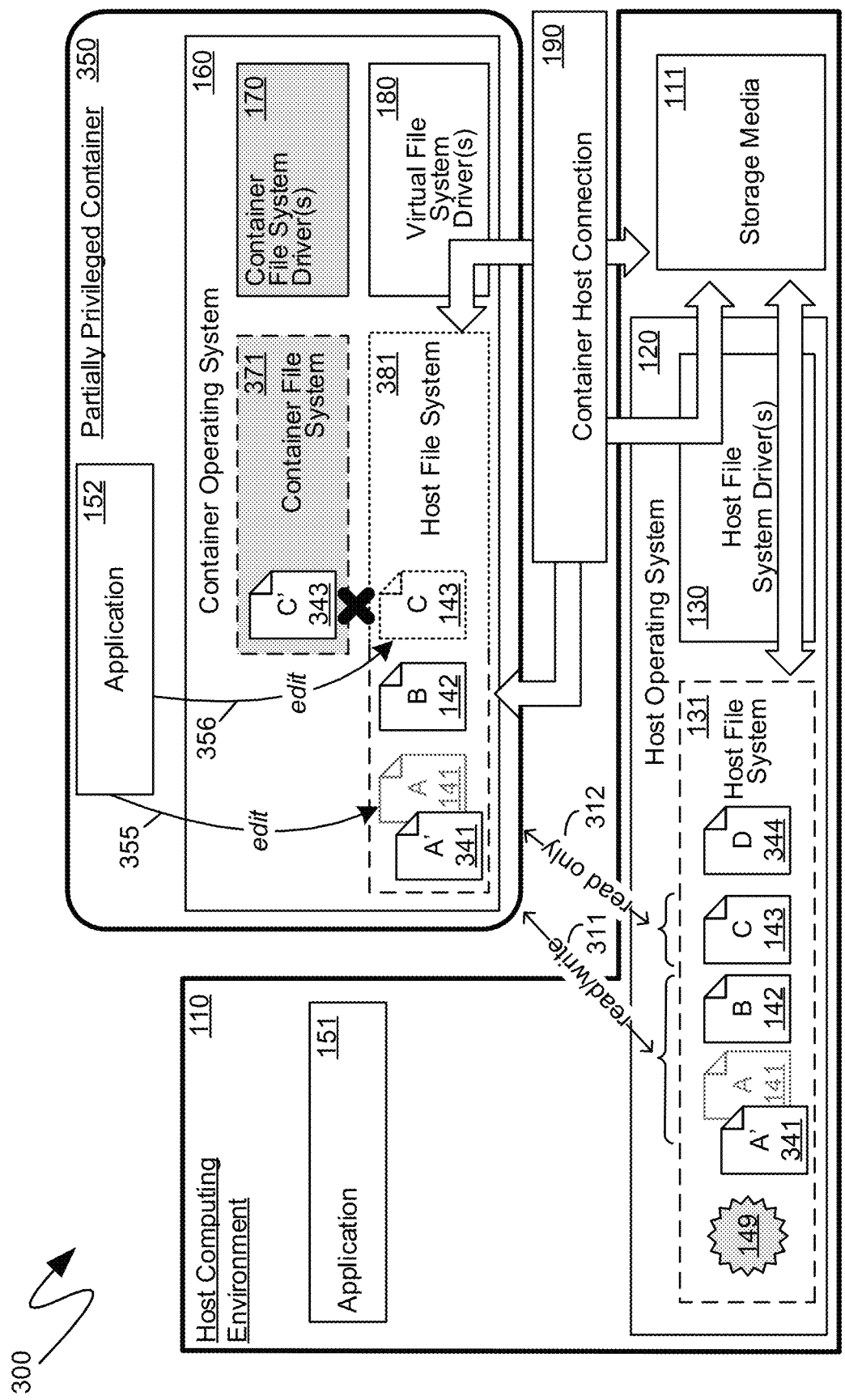
FIG. 3 is a system diagram of an exemplary partially privileged container virtual computing environment.

Turning to FIG. 3, one exemplary partially privileged container virtual computing environment, in the form of the exemplary partially privileged container virtual computing environment 350 is shown. Partially privileged containers can have more finely grained privilege, allowing processes executing within such partially privileged containers the ability to perform some privileged actions, while continuing to protect and isolate the underlying host computing environment from other types of privileged actions. As will be detailed below, such fine granularity can include allowing processes executing within a partially privileged container to modify files, but prevent modification of aspects of the host operating system, or allow modification of specific aspects of the host operating system but prevent modification of other aspects of the host operating system, or allow privileged access to only specific portions of the host file system, or other like finer-granularity distinctions. If an action attempted by a process within a partially privileged container is not allowed, such an action can still be completed within the context of the virtual computing environment created by the partially privileged container, thereby allowing the process to operate freely within the virtual computing environment created by the partially privileged container, while still protecting the underlying host computing environment, and maintaining isolation between certain aspects of the host computing environment and the virtual computing environment created by the partially privileged container.

By way of an illustrative example, the exemplary system 300, shown in FIG. 3, illustrates a partially privileged container in the form of the exemplary partially privilege container 350 that has been provisioned to allow both reading and writing 311 to only a portion of the host file system 131, while being provisioned to only allow reading 312 to the remainder of the host file system 131. Additionally, the host file system 131 may have additional files, directories, or other portions that it does not expose, even in a read-only capacity, to the partially privileged container 350. File 344, shown in FIG. 3, represents one such portion of the host file system 131. This may be implemented as a part of the host operating system 120, through aspects of the container host connection 190 or some other component. The privileges associated with the container process 350 as executing on the host computing environment 110, or the actions that the container process 350 can perform on the host computing environment 110, are enforced by the host operating system 120, including, for example, by the kernel of the host operating system 120, in combination with a container definition file, or other like data structure that identifies functions or actions that the container process 350 can, or cannot, perform in the host computing environment 110, such as the exemplary functions 311 and 312. To allow for processes to execute within the partially privileged container virtual computing environment 350, actions that the container 350 is not allowed to perform, and which, thereby, cannot be performed on the host computing environment 110 by any processes executing within the partially privileged container virtual computing environment 350, such actions are, instead, performed within the isolated environment of the partially privileged container 350, thereby maintaining isolation from the host computing environment 110 and maintaining protection of the host computing environment 110.

As shown in the exemplary system 300, execution of the application 152 can result in the modification of files such as, for example, the files 141 and 143. For example, the file 141 can be a document that can be created and edited by the application 152, while the file 143 can be a component that can be jointly used by both the application 152, as well as by other application programs. In such an example, it may be desirable to prevent modification of the file 143 on the host computing environment 110. For example, continued operation of the application 151 may be based on the file 143 remaining in an unmodified state. Thus, in such an example, if the application 152 were to modify the file 143, the application 151 may cease to execute properly or in a desirable manner. However, the application 152 may need to modify the file 143 as a precondition for its own execution. To prevent modification of the file 143 in the host file system 131, the host operating system 120 may designate certain portions of the host file system 131, such as the portion within which the file 143 is stored, to require a higher level of privilege to access and/or modify files within those portions of the host file system 131. For example, operating systems often require elevated privilege levels, such as "administrator" privilege levels, or "super-user" privilege levels to access specific files, folders or directories that are necessary or important for the operation of the operating system and/or specific applications.

In conjunction, the host operating system 120 can actively prevent the container process 350 from editing, deleting or otherwise modifying those portions of the host file system 131. As will be detailed further below, such prevention is based on an enumerated as a listing of allowed, or disallowed actions, which can be directly referenced, or referenced based on metadata associated with such actions, such as privilege levels required to perform such actions, or identification of specific origins or targets of such actions. In such a manner, a more finely-grained privilege, or limitations, can be enforced on processes executing within a container.

More specifically, and as illustrated by the exemplary system 300 of FIG. 3, when processes executing within the partially privileged container virtual computing environment 350, such as the exemplary application 152, attempt to perform an action, multiple privilege determinations are made. Initially, within the context of the partially privileged container virtual computing environment 350, the container operating system 160 checks whether the execution of the application 152 is associated with a user that has sufficient privilege to, for example, edit the files 141 and 143. As indicated previously, in the present example, the application 152 may need to edit a file, such as the file 143, that can require administrator, super-user or other like elevated privilege. In such an example, therefore, a user seeking to effectively execute the application 152, including within the partially privileged container computing environment 350, will need to execute the application 152 with administrator, or super-user rights. However, if the user were to execute the application 152 with such elevated privilege within the context of a traditional privileged container, such as the privileged container 250 detailed previously, the application 152 would have access to all of the host file system 131, since there would exist no mechanism that would prevent any such access, other than the privilege check performed by the host operating system 120, and that privilege check would determine that the application 152 was executing with a sufficiently high level of privilege to have access to all of the host file system 131.

By contrast, the exemplary partially privileged container 350 provides more fine-grained privilege controls. In particular, while the privilege check performed by the container operating system 160 can determine that the application 152 is being executed with a sufficient level of privilege to perform both of the edit actions 355 and 356, a subsequent check performed by the host operating system 120, which will be detailed further below, determines that the action 356 is not allowed. As indicated previously, such a determination can be made with reference to an implicit or explicit delineation of allowed and/or forbidden actions.

If the host operating system 120 determines that, for example, the edit action 355 is allowed, then the edit action 355 proceeds to edit the file 141, replacing it with the edited file 341. Such an action is directly performed on the host file system 131, such as in a manner analogous to that described above with reference to exemplary privileged container 250 of FIG. 2. By contrast, if the host operating system 120 determines that, for example, the edit action 356, directed to the file 143, is not allowed, the denial is accommodated by the container host connection 190, which can interface with virtual file system drivers 180 to allow the edit action 356 to proceed in the context of the partially privileged container computing environment 350 in the same manner as with the traditional nonprivileged container 150 described in detail above. More specifically, the host file system 381 can be comprised of a first subsection that is provided by the host filesystem drivers 130, such as in the manner illustrated by the system 200 of FIG. 2, and described in detail above, and can be further comprised of a second subsection that is provided by the virtual filesystem drivers 180 such as in the manner illustrated by the system 100 of FIG. 1, and described in detail above. The subsection provided by the virtual filesystem drivers 180 acts, such as with respect to the file 143, as an underlay, and the edit action 356 creates a new file 343 in the container file system 371, which acts as an overlay, whereas, by contrast, the subsection provided by the host filesystem drivers 130 acts, such as with respect to the file 341, as the host file system 131. Thus, as detailed previously, from within the partially privileged container computing environment 350, the application 152 sees the edited version of the file 341 and the edited version of the file 343, while, from within the host computing environment 110, the application 151 sees the edited version of the file 341, but sees only the original version of the file 143. The container file system 371, implemented by either the same container filesystem drivers 170, or analogous versions thereof, to those detailed above, can provide filesystem overlay for those portions of the host file system 381 to which actions by processes executing within the partially privileged container 350 are not allowed by the host operating system 120. As before, the information relevant to provide the container file system 371, such as the information associated with the edited file 343, is stored in a sandbox, such as the exemplary sandbox 149, described in detail above, and still shown as part of the host file system 131 in the exemplary system 300 FIG. 3.

In such a manner, the partially privileged container 350 provides a mechanism by which processes executed therein can be allowed to perform some functionality that impacts the host computing environment 110, while simultaneously maintaining isolation between the container computing environment 350 and host computing environment 110 for other types of functionality.

According to one aspect, it may be beneficial for the host computing environment 110 to use the most recent version of a file, while, simultaneously, such as for compatibility purposes, ensuring that one or more earlier versions co-exist with the most recent version. For example, some newer file versions may have better security and functionality that would benefit the host operating system 120, and/or the application 151. In such an instance, file 341 and file 141 are both available to the host computing environment 110 for use. File 341 may be selected as the default, however if, for example, application 151 tried to use file 341 and failed in some manner, it may fall back and continue to use file 141 instead. Additionally, multiple partially privileged containers, such as the exemplary partially privileged container 350, may update file 341 more than once. If more than one version exists, the host computing environment 110 may implement a rollback mechanism and/or a side-by-side file store to manage access to these multiple file versions and ensure the optimal compatibility.

Figure 4:
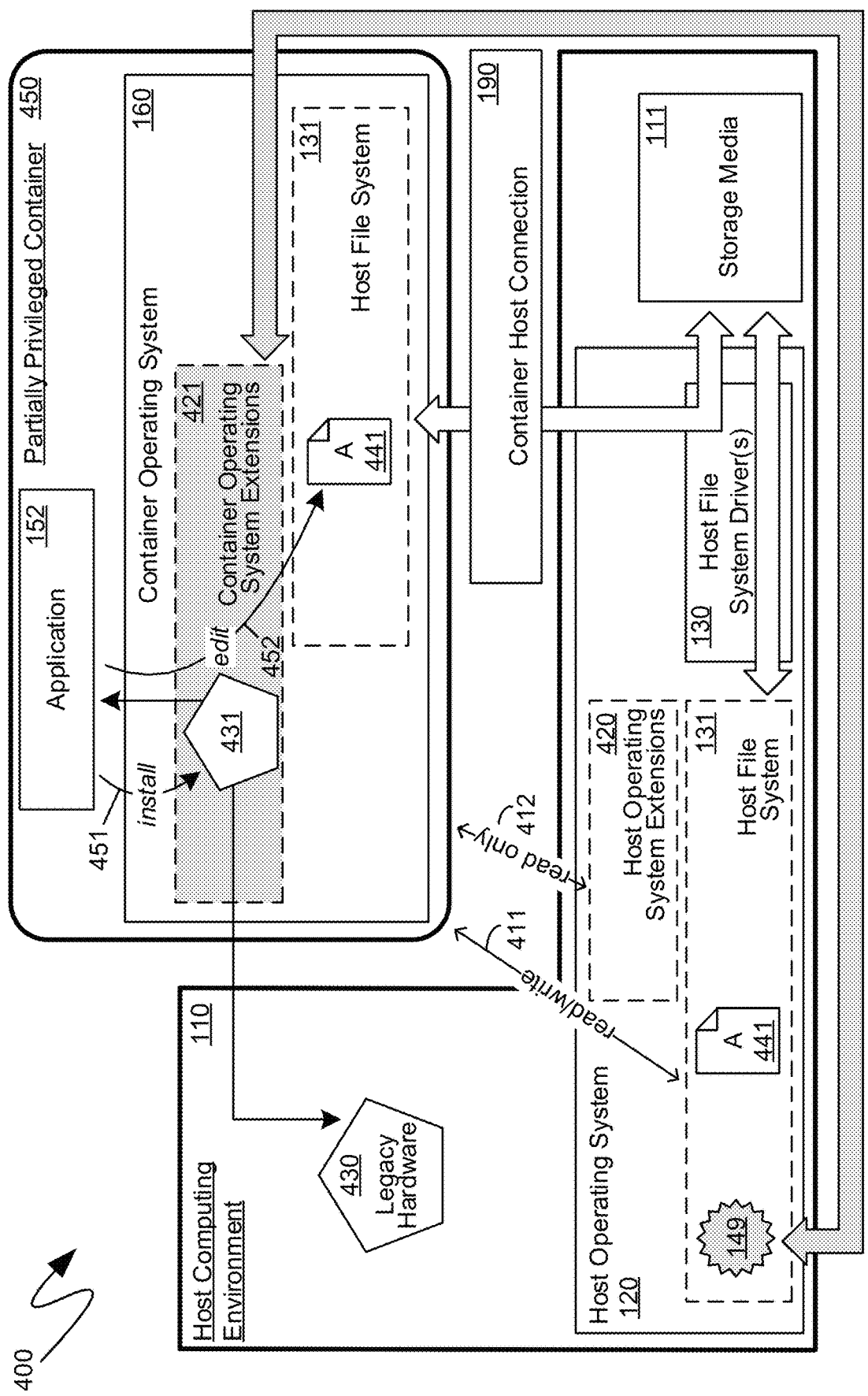
FIG. 4 is a system diagram of another exemplary partially privileged container virtual computing environment.

While illustrated within the context of file system access, such partial privilege can include other functionality, such as the ability to modify the system time, or other like computing environment parameters, as well as installing, removing, and/or modifying drivers, mini-filters, firmware, registry entries, or the like. For example, the exemplary system 400, shown in FIG. 4 illustrates another exemplary partially privileged container in the form of the exemplary partially privileged container 450. As with the exemplary partially privileged container 350 detailed above, the exemplary partially privileged container 450, of the exemplary system 400, can have certain actions that the host operating system 120 will allow processes executing within such a partially privileged container 450 to perform, certain actions that the host operating system 120 will not allow, or combinations thereof. For example, the exemplary partially privileged container 450 can be allowed, by the host operating system 120, to have read/write access 411 to the host file system 131, but not to modify any of the host operating system extensions 420, as illustrated by the read only access 412. Operating system extensions 420 include drivers, including software-only drivers, such as driver extensions, virtual device drivers, and the like, mini-filters, firmware updates, registry changes, operating system settings, such as the current time, operating system services, daemons, background processes and other like operating system extensions. Such a partially privileged container 450 can be utilized to facilitate interaction with, for example, legacy hardware, such as the exemplary legacy hardware 430, that can be part of the host computing environment 110, without potentially negatively impacting the host operating system 420, such as by installing an operating system extension, such as the exemplary operating system extension 431, onto the host operating system 420. For example, the exemplary operating system extension 431 may be capable of introducing vulnerabilities, instabilities, or other like undesirable behavior if allowed to continually execute as part of the host computing environment 110. Nevertheless, the exemplary extension 431 may be necessary to enable communication with, for example, the legacy hardware 430.

More specifically, and analogously to that described in detail previously, an application executing within the partially privileged container computing environment 450, such as the application 152, first installs the extension 431, as illustrated by the install action 451. As before, such an install action 451 requires that the application 152 execute at a high level of privilege, such as by a user having administrator or super-user rights. Accordingly, the container operating system 160 determines that the application 152 executes with a sufficient level of privilege to install the extension 431. However, when the application 152, executing from within the partially privileged container 450, attempts to access the host operating system extensions 420 to continue the installation 451 of the extension 431 thereon, the host operating system 120 determines that such an action is not allowed. As before, the action is then completed within the computing environment of the container itself, and isolated from the host computing environment 110. In the instant example, installation of the extension 431 is, instead, directed to the container operating system extensions 421 that are an overlay over the host operating system extensions within the context of the partially privileged container computing environment 450 in a manner analogous to the container file system 141 overlaying the host file system 181 within the container 150, detailed above, and shown in FIG. 1. To avoid visual overcrowding certain components and aspects analogous to those previously detailed are not visually represented within FIG. 4. Nevertheless, aspects and components of the container operating system 160 include mechanisms by which the container operating system extensions 421 are overlaid over the host operating system extensions 420, which are also visible and accessible to applications executing within the partially privileged container computing environment 450, such as the exemplary application 152. The installation 451 of the extension 431, therefore, is successfully completed, in the sense that, from the perspective of processes executing within the partially privileged container computing environment 450, such as the exemplary application 152, the extension 431 is part of the operating system extensions available to such processes.

To continue the illustrative example, having successfully (from the perspective of the application 152) installed the extension 431, the application 152 then utilizes the extension 431 to access the legacy hardware 430 and utilize the legacy hardware 430 to create, edit, or otherwise modify a file 441, as illustrated by the action 452. For example, the legacy hardware 430 can be an old digital camera, and the extension 431 can be required to establish a communicational connection with such a digital camera. The file 441 can be a photo that the application 152 copies off of the legacy hardware 430, utilizing the extension 431, and copies onto the host file system 131, with such a copy being illustrated by the edit action 452. In such a manner, the partially privileged container 450 can facilitate utilization of legacy hardware, or other analogous actions, without modifying the host operating system 120, such as by installing an old extension that may cause instability, or may otherwise be incompatible with aspects of the host operating system 120.

The fine-grained privileged access provided by the partially privileged containers described herein can be utilized to incrementally update aspects of the host computing environment 110. For example, the exemplary system 400 described above can facilitate the installation of the extension 431 onto a host operating system 120 if the compatibility between the extension 431 and the host operating system 120 is unknown or questionable. Effective and proper installation and subsequent utilization of the extension 431 within the context of the partially privileged container computing environment 450, such as by the application 152, acts as a verification that the extension 431 was properly and completely installed, has not caused any incompatibilities or instabilities, and is otherwise functioning properly within the context of the underlying host computing environment 110, with the additional overlaid aspects, such as the container operating system extensions 421. With such a verification, it can be desirable to install the extension 431 directly into the host operating system extensions 420, so that the installation of the extension 431 can survive the termination of the partially privileged container process 450.

According to one aspect, changes made within the partially privileged container process 450, such as the installation of the extension 431 into the container operating system extensions overlay 421, are persisted onto the host computing environment 110, such as upon the aforementioned verifications, or, alternatively, or in addition, upon termination of the partially privileged container process 450. More specifically, the sandbox 149 can comprise information delineating the overlay portions, such as the exemplary container operating system extensions overlay 421, that are unique to the partially privileged container computing environment 450, and are otherwise isolated from the host computing environment 110. Such information can be in the form of enumerated transactions, which, if applied to the host computing environment 110, would re-create the computing environment of the partially privileged container 450. For example, changes to NTFS files are recorded, or otherwise stored, in the NTFS file system as discrete transactions. Such discrete transactions can be replayed, or re-performed, to re-create the computing environment of the partially privileged container 450 in the host computing environment 110.

Figure 5:
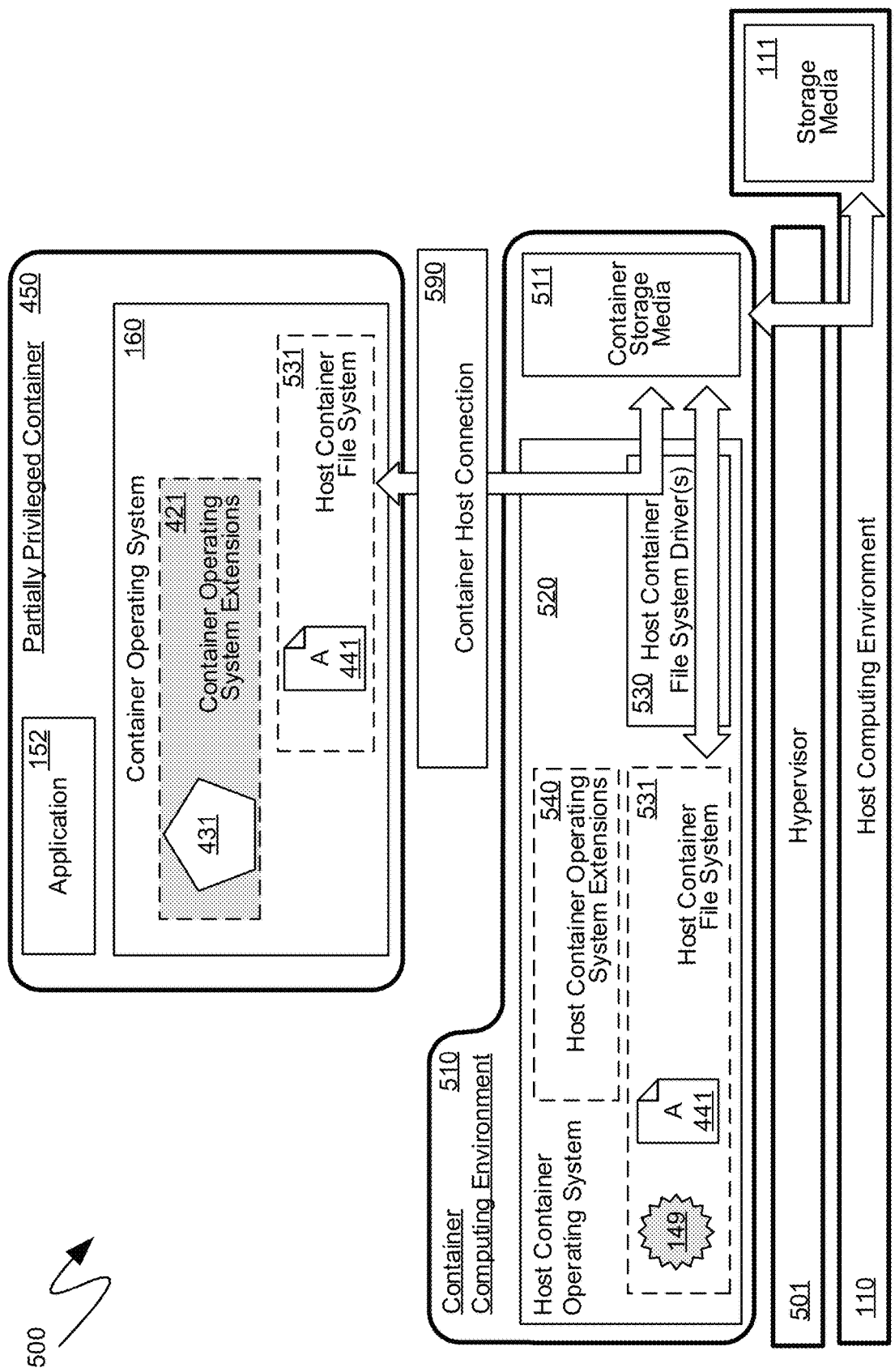
FIG. 5 is a system diagram of exemplary nested virtual computing environments.

While described within the context of a single container virtual computing environment executing on a host physical computing environment, the above-described mechanisms are equally applicable to container virtual computing environments executed inside of other container virtual computing environments. For example, the exemplary system 500, shown in FIG. 5, illustrates the partially privileged container 450, except now being hosted by a container computing environment, in the form of the exemplary container computing environment 510. More specifically, a container host connection 590, analogous to the container host connection 190 described previously, communicationally and functionally couples the partially privileged container 450 to the container computing environment 510. Like the previously described host computing environment 110, the container computing environment 510 comprises an operating system, such as in the form of the host container operating system 520, which comprises filesystem drivers, such as the host container filesystem drivers 530, analogous to the host filesystem drivers 130 described previously. The host filesystem drivers 530 facilitate the presentation of a host container file system 531, analogous to the host file system 131, and the host container operating system 520 also comprises host container operating system extensions 540, analogous to the host operating system extensions 440 described previously.

The container computing environment 510 is executed on the host computing environment 110 in a manner analogous to the execution of the other containers illustrated in FIGS. 1-4 and described in detail above. According to one aspect, the container computing environment 510 virtualizes aspects of computing hardware, such as the exemplary storage media 111, of the host computing environment 110, which is virtualized as the container storage media 511. In such a manner, the container computing environment 510 virtualizes more of a computing environment than the containers illustrated in FIGS. 1-4 and described in detail above, including, for example, a virtualized operating system kernel. More colloquially, the container computing environment 510 can be closer to a full virtual machine computing environment, than to more lightweight container virtual computing environments.

Often, container computing environments, such as the exemplary container computing environment 510, that virtualize a greater extent of a computing environment, are utilized to provide hardware independence and fault tolerance in server cluster computing environments. For example, multiple container computing environments, such as the exemplary container computing environment 510, can be instantiated in anticipation of an increase in demand from remote clients. Such remote clients utilize the container computing environments as any other computing environment, and when such computing environments are no longer required, the container processes can be terminated. Additionally, should any of the hardware computing devices fail, the container processes can be instantiated on other hardware computing devices and the clients' utilization thereof can continue unabated. In such a manner, a fixed set of hardware computing devices can accommodate a varying quantity of remote clients while maintaining fault tolerance and location independence. In such environments the ability of a container computing environment, such as the exemplary container computing environment 510, to host a partially privileged container, such as the exemplary partially privilege container 450, provides for the same benefits as detailed above including, for example, allowing clients to incrementally update aspects of their computing environments, namely the computing environments provided by the container computing environment 510.

Another utilization of multiple nested container computing environments, such as those illustrated in the exemplary system 500 shown in FIG. 5, is to test, or otherwise verify, that externally-sourced processes do not violate or exceed privilege thresholds or limitations established by operating system vendors, information technology departments, or other like standard-setting entities. For example, a container computing environment, such as the exemplary container computing environment 510, can be established to simulate a standard computing environment that may need to be updated utilizing a container-sourced update, such as that detailed above with reference to FIG. 4. If the operation of the partially privileged container 450, as hosted by such an exemplary container computing environment 510 fails, then the update exceeds a threshold level of privilege with which the container computing environment 510 has been provisioned, indicating, for example, that the update does not conform to the relevant guidelines. Other like testing or verification can likewise be performed utilizing nested container computing environments.

Figure 6:
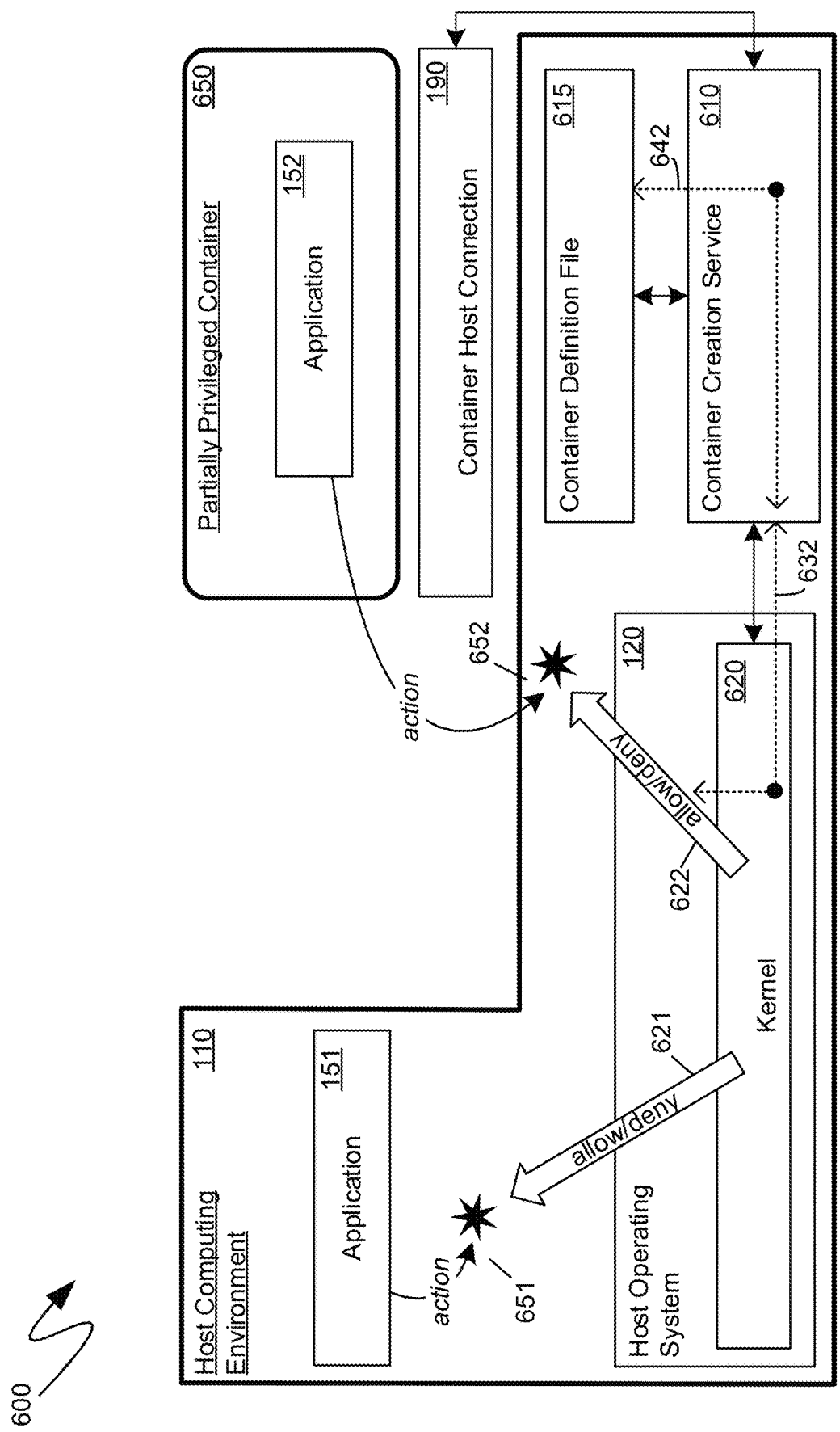
FIG. 6 is a system diagram of an exemplary mechanism for enforcing partial privilege onto container virtual computing environments.

Turning to FIG. 6, the above described operations enforcing more finely grained limitations on privileged containers are described in greater detail with reference to the exemplary system 600 shown therein. In particular, within the host computing environment 110, when an application, such as the exemplary application 151, performs an action, such as the exemplary action 651, a determination 621 is made by the kernel 620, of the host operating system 120, in combination with other operating system components, as to whether such an action 651 is to be allowed or denied. Typically, such a determination includes querying multiple sources through which limitations can be enforced, including comparing a level of privilege required for the action 651 to the level of privilege within which the application 151 is being executed, such as would be identified by the user token of the user triggering the execution of the application 151, as well as comparing an identification of the user executing application 151 to users identified as being allowed to access relevant data, such as would be delineated in an access control list or other like database.

According to one aspect, the kernel 620 can be modified to query, or to otherwise obtain information from, other sources in determining whether to allow or deny an action from a process executing within a container that will change aspects of the host computing environment. As utilized herein, the term "aspects of the host computing environment" does not include changes or updates exclusively to the sandbox, since such data is meant to be accessible only from within the container computing environment, and is otherwise isolated from the host computing environment, with the exception that the sandbox is stored on the host computing environment. More specifically, when the kernel 620 receives a request by a process executing within a container process, such as the exemplary application 152, executing within the exemplary partially privileged container process 650, to perform an action, such as the exemplary action 652, in addition to one or more of the other checks detailed above, the kernel 620 also obtains information as to whether the action 652 is to be allowed based upon the settings of the partially privileged container 650. For example, as illustrated by the communication 632, the kernel 620 communicates with a container-oriented service, such as the exemplary container creation service 610, which, for example, creates and/or maintains the previously described container host connection 190. In turn, as illustrated by the communication 642, the container creation service 610 references a container definition file, such as the exemplary container definition file 615, or other enumeration or identification of the actions that processes executing within the partially privilege container 650 are either allowed, or not allowed to perform. As indicated previously, such an enumeration or identification of actions can be explicit or implicit and can identify the actions in accordance with any identification mechanism including, for example, action identifiers, required action privileges, the source of the action, the files, objects, libraries, or other data being acted upon, and other like identification mechanisms. The container creation service 610 then informs the kernel 620 and the kernel makes a determination 622 that allows or denies the action 652.

As part of the operation of components such as the container creation service 610 and the kernel 620, there can be additional steps performed to verify the identity of partially privileged container 650, application 152 and related components. This includes checking certificates, hashes and/or digital signatures, performing software license checks, scanning for virus signatures, checking with remote services over a network, checking user identities, and so forth. The information obtained from such checks can further information the decision of whether to allow or deny an action, such as the exemplary action 652. Such checks may occur at any point in the container lifecycle, including, for example, when the container is built, packaged, distributed, downloaded, initialized, paused, resumed, terminated, and the like. According to one aspect, an allowance or denial by the kernel 620, based upon information received from the container creation service 610, or other like container information source, is the same as, or analogous to, an allowance or denial by the kernel 620 based upon traditionally referenced information such as level of privilege. As indicated previously, according to one aspect, a denial of the action 652 can result in the action being performed, at least initially, within the container computing environment 650, and not within the host computing environment 110.

Figure 7:
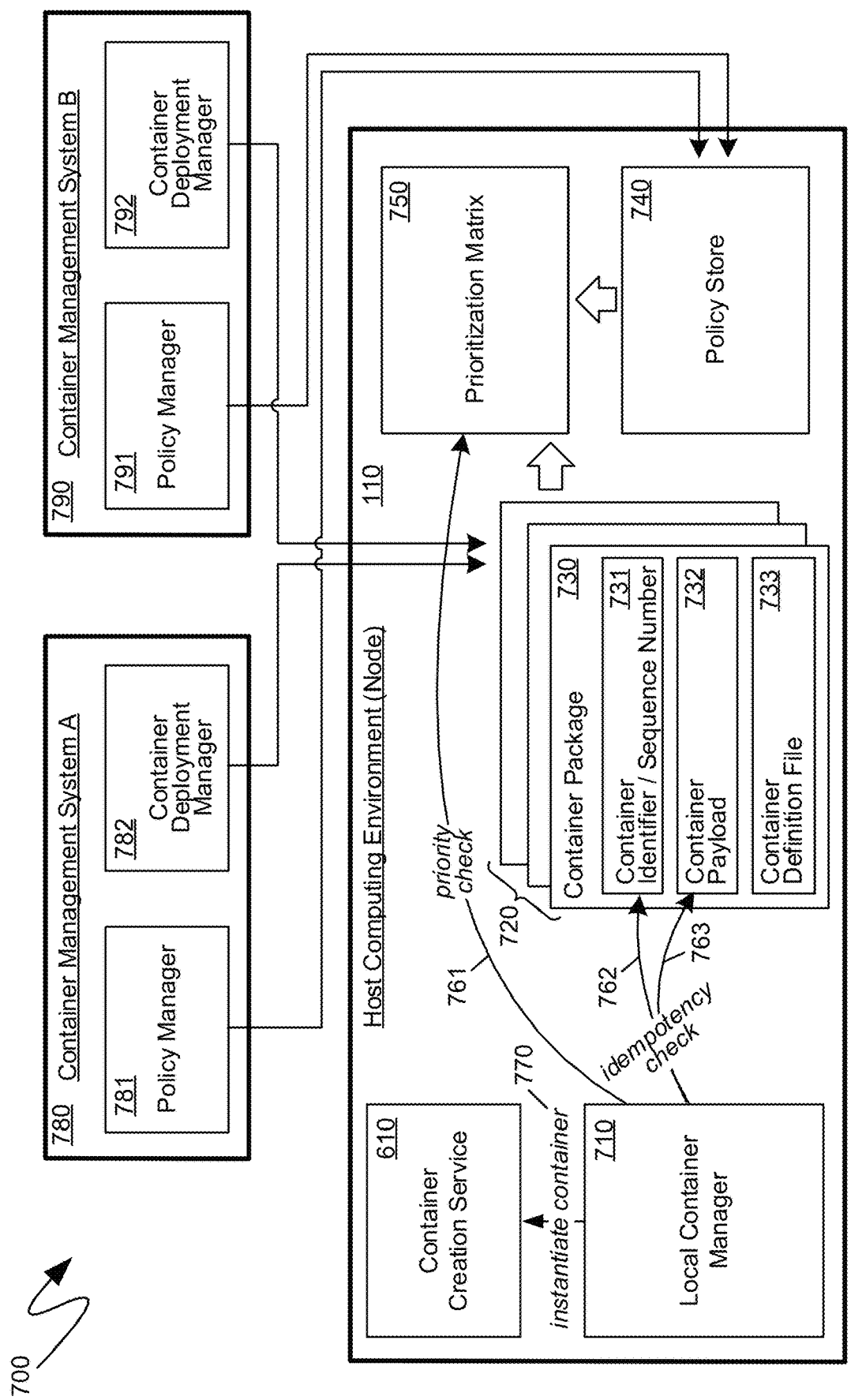
FIG. 7 is a system diagram of an exemplary container-based node maintenance delivery mechanism.

Turning to FIG. 7, the exemplary system 700 shown therein illustrates an exemplary utilization of partially privileged containers to perform maintenance, updates, installations, or other like service functionality on the host computing environment 110, which is also often referred to as a "node" within clustered computing environments. The node 110 can have multiple container packages stored at any one time ready for subsequent instantiation, such as by the container creation service 610. A queue 720 of container packages is illustrated as being stored on the node 110. Each container package, such as the exemplary container package 730 comprises a container payload, such as the exemplary container payload 732, which contains computer-executable instructions that are to be executed within the container virtual computing environment, data it is to be utilized or installed from within the container virtual computing environment, and other like code and/or data. A container package, such as the exemplary container package 730, and also comprise a container definition file, such as the exemplary container definition file 733, which, as indicated previously, can delineate limitations on the functionality performable by processes executing within the partially privileged container. Optionally, a container package, such as the exemplary container package 730, can be associated with a container identifier 731, which can be an identifier, a sequence number, or other like container identification information.

In some instances, container management systems may utilize partially privileged containers to perform incremental maintenance, updates, installations, or other like service functionality on multiple computing devices including, for example, the node 110. Such incremental service can be deterministic in that a subsequent service requires, as a precondition, that a prior service has been previously properly performed and completed. For example, the installation of an update to an existing application program may require that an updated driver has already been installed. Such preconditions are specified, such as through policy associated with a container, the container definition file, or other like metadata. The provision of a container package, such as the exemplary container package 730, to the container creation service 610, for the container creation service 610 to instantiate the container, is performed by a local container manager, such as the exemplary local container manager 710, which confirms that the necessary and/or specified preconditions are satisfied before providing the container package to the container creation service 610 to instantiate the container, such as is illustrated by the action 770.

In addition to specifying preconditions, such as for incremental updates or other like maintenance to be performed by processes executing within multiple sequentially instantiated partially privileged container computing environments, container management systems can also provide container policy which further delineates which containers are to be instantiated, what order the containers are to be instantiated in, relevant node computing conditions that can affect the instantiation of the containers, and other like container policy. As illustrated by the exemplary system 700, a single node, such as the exemplary node 110, can receive container packages from multiple container management systems, such as the exemplary container management systems 780 and 790. More specifically, container deployment managers, such as the exemplary container deployment manager 782, of the container management system 780, and the exemplary container deployment manager 792 of the container management system 790, independently provide container packages to the node 110 which, as indicated previously, are retained in a container package queue, such as the exemplary container package queue 720. In addition, container management systems include policy managers, such as the exemplary policy managers 781 and 791, which provide updated policies, which can impact a single container or multiple containers, in the node 110 retains such policies in a policy store, such as the exemplary policy store 740.

The receipt of a policy sometimes results in the deprecation, deactivation, or other like impact on previously received policies retained in the policy store 740. For example, a subsequently received policy can indicate that a previously received policy is no longer valid. In such an instance, in addition to retaining the newly received policy in the policy store 740, the local container manager 710, or other like process, also removes the no longer valid policy, or otherwise updates the policies stored in the policy store 740.

According to one aspect, utilizing the information specified by received policies, container definition files, or other container metadata, a prioritization matrix, such as the exemplary prioritization matrix 750, is created, such as by the local container manager 710. The prioritization matrix 750 comprises different priorities by which containers contained in the queue 720 are to be instantiated based upon different preconditions or other like input. For example, the prioritization matrix 750 can indicate that one container is to be instantiated before another if available system resources on the node 110 exceed a threshold, but that the second container is to be instantiated prior to the first if the available system resources are below the threshold.

The local container manager 710 provides a container to the container creation service to instantiate, as illustrated by the action 770, based upon priority checks, such as the exemplary priority check 761, idempotency checks, such as the exemplary idempotency checks 762 and 763, or combinations thereof. A priority check, such as the exemplary priority check 761, confirms that the necessary, or enumerated, preconditions for the instantiation of a container are met. The priority check can reference the prioritization matrix 750, as well as independently confirm the existence of the relevant preconditions. An idempotency check confirms that processes executing within a partially privileged container virtual computing environment are idempotent with respect to the post computing environment 110. In particular, some processes may perform actions that, if the actions are performed again, no additional changes are made to the host computing environment 110. For example, a process installing an extension can be idempotent if it checks for the existence of the extension before commencing installation. If such a process were to be executed multiple times, no additional extensions, or copies of the same extension, would be installed. By contrast, a process that increments a counter is not idempotent since each subsequent execution of such a process will continue to increment the counter. According to one aspect, the container can be certified, such as through a cryptographically secure third-party certification, or other like certification, as being idempotent. Alternatively, idempotency can be enforced by the local container manager 710, such as by the idempotency checks 762 and 763, which can reference container identifiers 731, sequence numbers, hashes of the container payload 732, or other like unique identifications of a container package 730 in order to identify container packages that have already been instantiated, to thereby avoid instantiating such container packages a subsequent time. A container package that satisfies such idempotency checks and priority checks is provided to the container creation service 610 to be instantiated, and processes execute therein, which, as indicated previously, can perform maintenance on the node 110.

According to one aspect, containers use metadata such as sequence numbers, acknowledgement numbers, time stamps, or other ordinal data to ensure that they are received and processed in order. Containers may be sent individually, in batches, in specially ordered groups, or otherwise distributed to destinations such as the host computing environment 110. When so distributed, ordering instructions such as encoded information, separately transmitted messages, processing instructions, location-based ordering, environment-based ordering, identity-based ordering, and the like are provided. The generation and processing associated with the prioritization matrix 750 processes such data and checks additional factors to determine the order and time in which these containers are instantiated and indicates this to local container manager 710 or other relevant components on the host computing environment 110.

In many transactional sequences, rollback is necessary when there is a failure. Prioritization matrix 750 also has the ability to facilitate a rollback mechanism to recover from failures. Such a rollback is initiated either from an external source, such as a container management system, another privileged container, as part of a policy file, or the like, or from a local determination, which can be based on policy, configuration, metadata analysis, or the like. As indicated, the prioritization matrix may depend on a transaction management system, and such a transaction management system may be run locally on the host computing environment 110 or remotely on some other node. Prioritization matrix 750 may depend on components such as a kernel transaction manager, a transaction-enabled file system, a transaction-enabled database, and the like. These components may enable prioritization matrix 750 to implement certain transactional operations for ordered and/or real-time processing spanning multiple containers. These transactional operations may be atomic, consistent, isolated, or durable. For example, when using partially privileged containers to send batched commands that process financial transactions with a given host computing environment 110, the prioritization matrix 750 can determine that it is required that these commands be executed in order so as to ensure that the financial transactions result in what customers and bank operators would expect. As a part of executing and logging these financial transactions, the prioritization matrix 750 monitors the transaction log and ensures it is complete. Prioritization matrix 750 may signal the relevant components on host computing environment 110, or a relevant remote node, including, for example, the container management system 780 or the container management system 790, when the transaction is complete. Such a determining the order of operations for execution, rollback and other transaction processing activities may be implemented by prioritization matrix 750, local container manager 710, container creation service 610 or any combination thereof.

Figure 8:
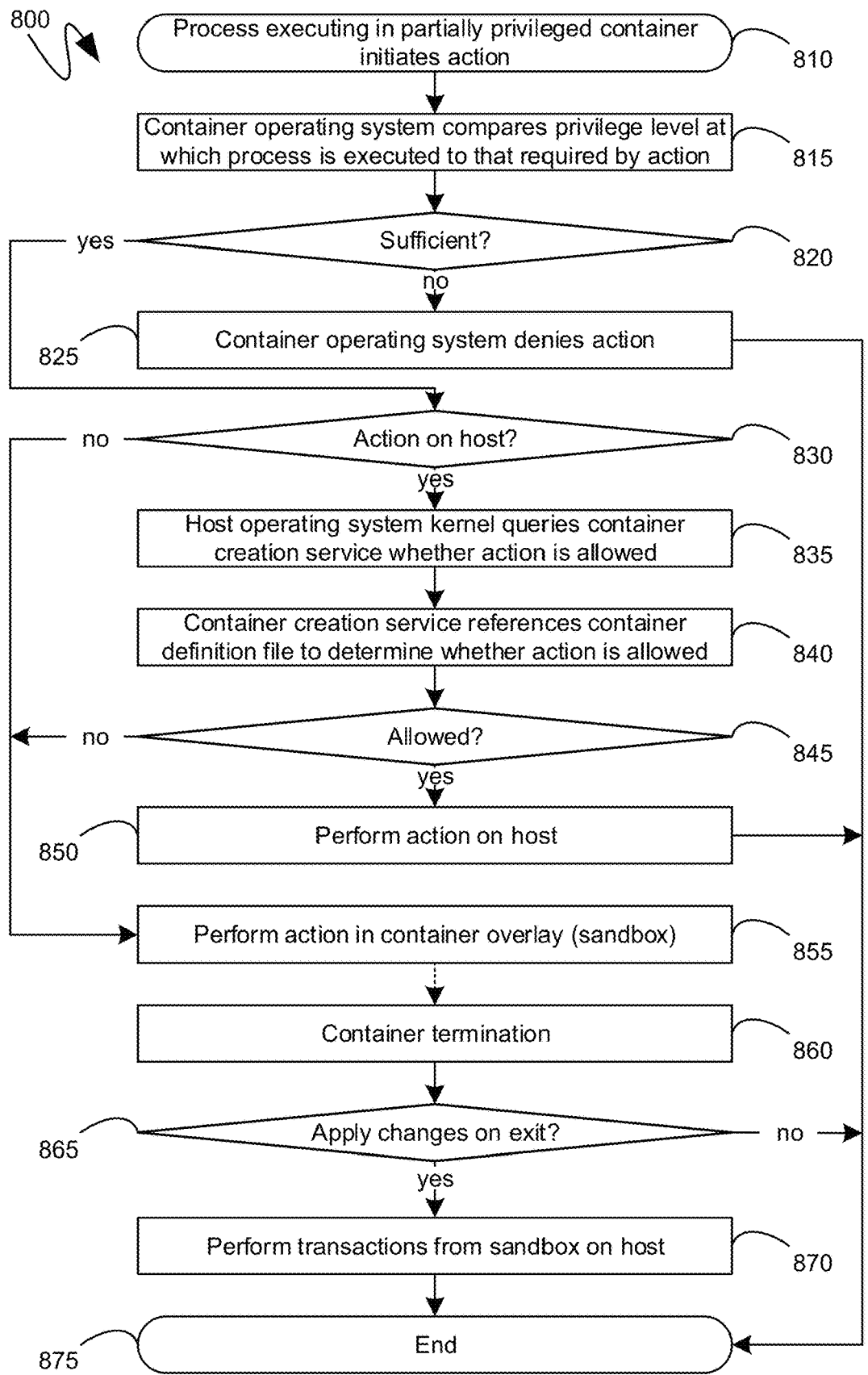
FIG. 8 is a flow diagram of an exemplary enforcement of partial privilege onto container virtual computing environments.

Turning to FIG. 8, the exemplary flow diagram 800 shown therein illustrates an exemplary series of steps by which a partially privileged container executes processes that can selectively impact an underlying host computing environment. Initially, at step 810, a process executing within a partially privileged container initiates an action, such as a modification of a file, an installation of a component, a change to a system property, such as a setting of a clock, or other like action. Subsequently, at step 815, operating system components executing within the container virtual computing environment compare the privilege level at which the process is being executed, such as by referencing a user token of the user executing the process, with the privilege level required to perform the action being initiated by the process at step 810. If, at step 820, the process is not being executed with a sufficient privilege level to perform the action, the process is prevented from performing such an action by operating system components executing within the context of the container, as illustrated by step 825, and the relevant processing ends at step 875. Conversely, if, at step 820, the process is being executed with a sufficient level of privilege, processing proceeds to step 830, at which point a determination is made as to whether the action being initiated, at step 810, will impact the underlying host computing device, such as in the manner defined above. If, at step 830, it is determined that the action initiated at step 810 is being performed only within the context of the container computing environment, then processing proceeds to step 855, and the action is performed within the context of the container computing environment, resulting in one or more modifications that are recorded in the sandbox and are, as detailed above, accessible only from within the container, and do not impact the host computing environment. Conversely, if, at step 830, it is determined that the action is being performed on the host computing device then processing proceeds to step 835 where the host operating system kernel can determine whether the action should be allowed. As indicated previously, such a determination includes the querying, at step 835, of a container-centric service, such as the container creation service, to determine whether the action is to be allowed. Such a querying is performed as part of already existing kernel mechanisms by which the kernel allows or denies actions, including already existing kernel mechanisms based on privilege, access control lists, and the like. At step 840, in response to the operating system kernel query at step 835, the container creation service references a container definition file or other delineation of allowed and/or denied actions.

Based on such information obtained by the container creation service, the kernel decides, at step 845, whether to allow or deny the action on the host. If, at step 845, the kernel allows the action, then the action is performed on the host at step 850, and the relevant processing ends at step 875. Conversely, if, at step 845, the kernel does not allow the action, the action is performed utilizing a relevant overlay within the context of the container computing environment and stored in the sandbox at step 855.

At a subsequent point, the container is terminated, as illustrated by step 860. According to one aspect, at step 865, a determination is made as to whether any of the changes made within the context of the container are to be persisted onto the host. As indicated previously, such determination can be based on a validation that changes within the container did not introduce instability, or properly performed, or are otherwise valid. If, at step 865, the changes are not to be persisted onto the host, then the relevant processing ends at step 875. Conversely, if, at step 865, the changes are to be persisted onto the host, processing proceeds to step 870 and the transactions from sandbox, such as NTFS transactions and other like transactions, are performed on the host to persist the changes on the host, and then the relevant processing ends at step 875.

Figure 9:
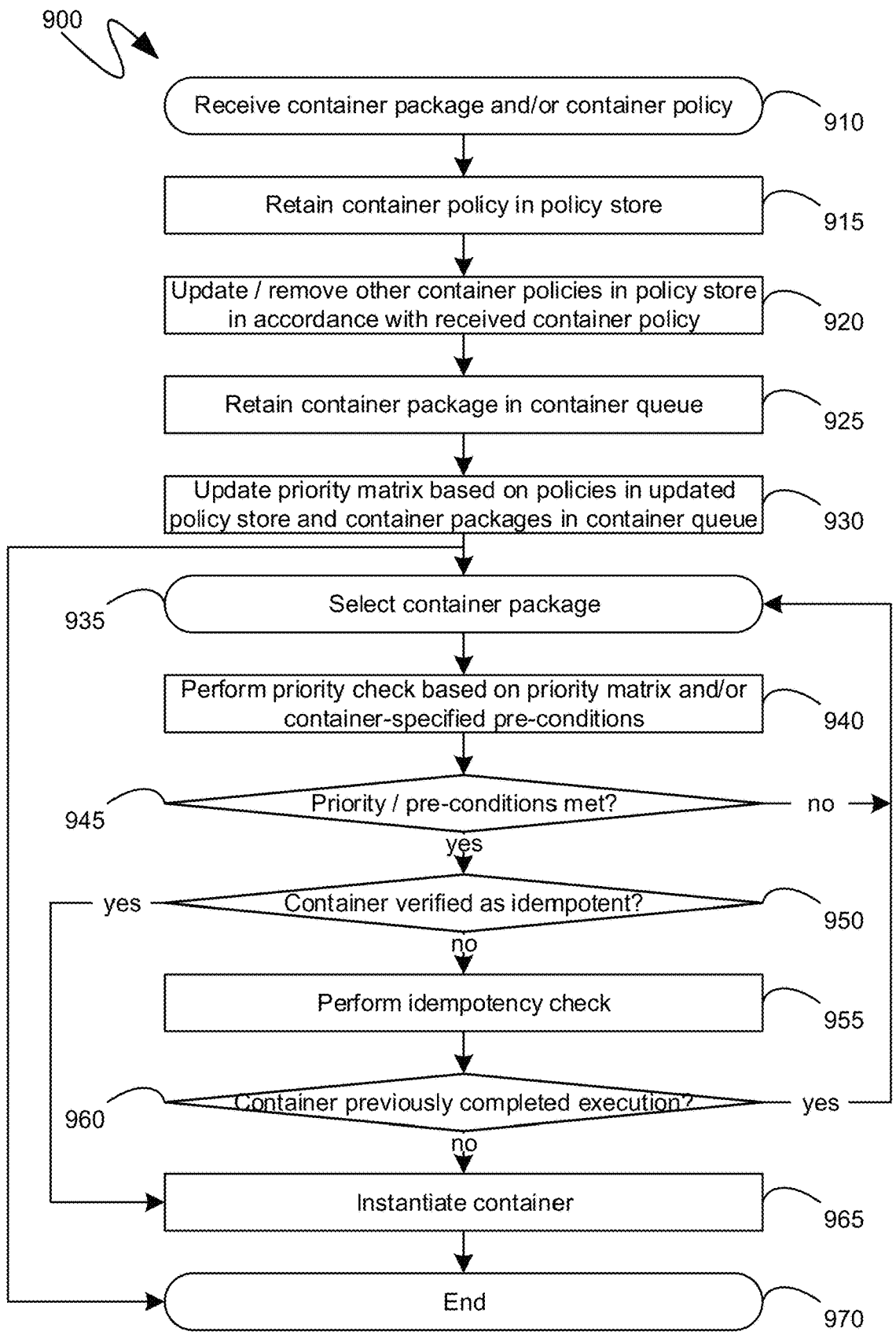
FIG. 9 is a flow diagram of an exemplary container instantiation.

Turning to FIG. 9, the exemplary flow diagram 900 shown therein illustrates an exemplary series of steps that can be performed as part of the instantiation of a container, such as a container received from remote container management service that utilizes partially privileged containers to distributes changes to host nodes, such as updates, patches, installations of executable instructions and other like changes. Initially, at step 910, a container package and/or container policy is received from a remote container management service. Subsequently, at step 915, if a container policy was received, at step 910, then such a container policy is retained in a policy store. The received container policy may change, supersede, or otherwise impact container policies that were previously received and are already in the policy store, and, in such an instance, at step 920, such other container policies can be updated or removed in accordance with the received container policy. At step 925, if a container package was received at step 910, then such a container package can be retained in a container queue or other like collection of received containers.

As described previously, a priority matrix can represent an interaction between the preconditions and policies relevant to containers already in the queue and to the containers themselves, delineating, for example, a priority of container instantiation given multiple different precondition scenarios. At step 930, such a priority matrix is updated based on the policy store updated at step 920 and the container queue updated at step 925. The relevant processing can then end at step 970.

Alternatively, processing proceeds to step 935, or commences with step 935, since step 935 does not require the receipt of a container package and/or container policy at step 910 to be triggered. At step 935 a container package is selected for instantiation. As part of the selection, or instantiation, of the container a priority check is performed, such as at step 940. More specifically, at step 940, any enumerated preconditions to the instantiation of the container, such as can have been specified by a corresponding container policy, or container metadata, such as a container definition file, are evaluated and, if those preconditions are not met, or if there are other containers with higher priority, as determined at step 945, then the currently selected container package is not instantiated at this time, and processing returns to step 935. Conversely, if it is determined, at step 945, that the preconditions are met, or that there are no other containers with higher priority, then the selected container is instantiated.

According to one aspect, in addition to performing a priority check, or as an alternative thereto, one or more idempotency checks can also be performed. Within the exemplary flow diagram 900, shown in FIG. 9, a determination of whether the container to be instantiated is idempotent is performed at step 950. As indicated previously, such a determination is based on a certification or other like verifiable indication that the container is idempotent and that the processes executed within such a container will only affect the host computing environment in ways that are not impacted if the container is inadvertently instantiated, and its processes executed multiple times. If, at step 950, there is no verification that the container is idempotent, an idempotency check is performed at step 955. Such an idempotency check includes one or more of performing a hash of the container payload, checking a container identifier, or other like action by which the container can be uniquely identified so as to compare with containers that have been previously instantiated and properly executed. If, at step 960, it is determined, based upon the idempotency check of step 955, that the selected container has been previously instantiated and the processes within such a container completely executed, then processing returns to step 935 and a different container package is selected. Conversely, if, at step 960, it is determined that the container has not been previously instantiated, or prior instantiations of the container have not been completed, such as by the container crashing, exiting, or otherwise improperly terminating, then processing proceeds to step 965 at which point the container selected at step 935 is instantiated. The relevant processing then ends at step 970.

Figure 10:
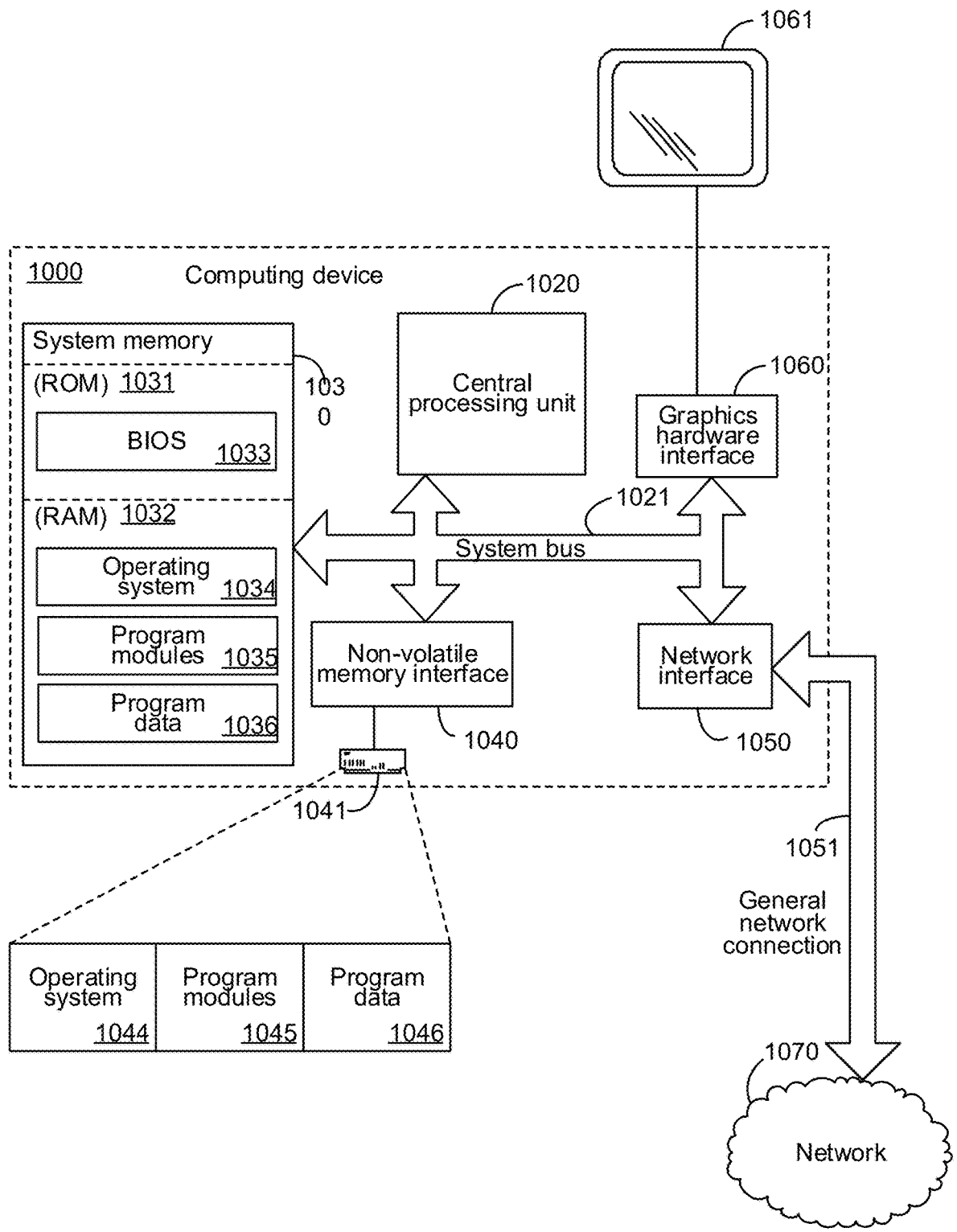
FIG. 10 is a block diagram of an exemplary computing device.

Turning to FIG. 10, an exemplary computing device 1000 is illustrated which can perform some or all of the mechanisms and actions described above. The exemplary computing device 1000 can include, but is not limited to, one or more central processing units (CPUs) 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. The computing device 1000 can optionally include graphics hardware, including, but not limited to, a graphics hardware interface 1060 and a display device 1061, which can include display devices capable of receiving touch-based user input, such as a touch-sensitive, or multi-touch capable, display device. Depending on the specific physical implementation, one or more of the CPUs 1020, the system memory 1030 and other components of the computing device 1000 can be physically co-located, such as on a single chip. In such a case, some or all of the system bus 1021 can be nothing more than silicon pathways within a single chip structure and its illustration in FIG. 10 can be nothing more than notational convenience for the purpose of illustration.

The computing device 1000 also typically includes computer readable media, which can include any available media that can be accessed by computing device 1000 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 1000. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer content between elements within computing device 1000, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, other program modules 1035, and program data 1036.

The computing device 1000 may also include other removable/non-removable, volatile/nonvolatile computer storage media. By way of example only, FIG. 10 illustrates a hard disk drive 1041 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 1041 is typically connected to the system bus 1021 through a non-volatile memory interface such as interface 1040.

The drives and their associated computer storage media discussed above and illustrated in FIG. 10, provide storage of computer readable instructions, data structures, program modules and other data for the computing device 1000. In FIG. 10, for example, hard disk drive 1041 is illustrated as storing operating system 1044, other program modules 1045, and program data 1046. Note that these components can either be the same as or different from operating system 1034, other program modules 1035 and program data 1036. Operating system 1044, other program modules 1045 and program data 1046 are given different numbers hereto illustrate that, at a minimum, they are different copies.

The computing device 1000 may operate in a networked environment using logical connections to one or more remote computers. The computing device 1000 is illustrated as being connected to the general network connection 1051 (to the network 1070) through a network interface or adapter 1050, which is, in turn, connected to the system bus 1021. In a networked environment, program modules depicted relative to the computing device 1000, or portions or peripherals thereof, may be stored in the memory of one or more other computing devices that are communicatively coupled to the computing device 1000 through the general network connection 1061. It will be appreciated that the network connections shown are exemplary and other means of establishing a communications link between computing devices may be used.

Although described as a single physical device, the exemplary computing device 1000 can be a virtual computing device, in which case the functionality of the above-described physical components, such as the CPU 1020, the system memory 1030, the network interface 1040, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 1000 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a computing device comprising: one or more processing units; and one or more computer storage media comprising computer-executable instructions, which, when executed by the processing units, cause the computing device to: instantiate a container virtual computing environment that is separate from a host computing environment on which the container virtual computing environment is instantiated; execute, with a first privilege level, a process within the container virtual computing environment, the process, as part of the execution, performing a first action that modifies a first computing environment aspect, the first action being performable by processes executed with the first privilege level; prevent, by an operating system of the host computing environment, the first action from modifying the first computing environment aspect of the host computing environment; and perform the first action in the container virtual computing environment thereby modifying the first computing environment aspect of the container virtual computing environment such that processes executing within the container virtual computing environment perceive the first action as having been completed but processes executing within the host computing environment perceive the first action as not having been completed; wherein the preventing is based on metadata associated with the container virtual computing environment, the metadata indicating that a second action, performed by processes executing within the container virtual computing environment and modifying a second computing environment aspect, is allowable to be performed to modify the second computing environment aspect of the host computing environment; and wherein the performing the first action in the container virtual computing environment is based on the preventing the first action from modifying the first computing environment aspect of the host computing environment.

A second example is the computing device of the first example, wherein the preventing the first action from modifying the first computing environment aspect of the host computing environment is performed by the operating system of the host computing environment in a same manner as if the operating system of the host computing environment had determined that the first action is not performable by processes executed with the first privilege level.

A third example is the computing device of the first example, wherein the performing the first action in the container virtual computing environment comprises modifying the first computing environment aspect in an overlay layer and storing the modified first computing environment aspect in a sandbox on the host computing environment.

A fourth example is the computing device of the first example, wherein the storing the modified first computing environment aspect in the sandbox comprises recording one or more transactions in the sandbox.

A fifth example is the computing device of the first example, wherein the one or more computer storage media comprise further computer-executable instructions, which, when executed by the processing units, cause the computing device to: perform the first action in the host computing environment, thereby modifying the first computing environment aspect of the host computing environment, upon termination of the container virtual computing environment.

A sixth example is the computing device of the first example, wherein the process with the container virtual computing environment performs at least one step of a multi-step transaction comprising other steps, the other steps performed by one or more processes executing within one or more other container virtual computing environments; and wherein further the instantiation of the container virtual computing environment is triggered by a transaction manager based on a success of a prior one of the one or more other container virtual computing environments.

A seventh example is the computing device of the first example, wherein the metadata associated with the container virtual computing environment specifies that modifications to files within a first portion of a file system are allowed to be performed on the host computing environment by processes executing within the container virtual computing environment.

An eighth example is the computing device of the first example, wherein the instantiating the container virtual computing environment is performed only after determining that enumerated pre-conditions associated with the container virtual computing environment have been met by the host computing environment.

A ninth example is the computing device of the eighth example, wherein a container package received by the computing device from a remote container management system comprises the enumerated pre-conditions and the metadata associated with the container virtual computing environment.

A tenth example is the computing device of the first example, wherein the container virtual computing environment was selected for instantiation based on policy information received by the computing device from a remote container management system.

An eleventh example is the computing device of the first example, wherein the instantiating the container virtual computing environment is performed only after performing an idempotency check associated with the container virtual computing environment.

A twelfth example is the computing device of the eleventh example, wherein the idempotency check comprises verifying a certification of idempotency associated with the container virtual computing environment.

A thirteenth example is the computing device of the eleventh example, wherein the idempotency check comprises determining that the container virtual computing environment has not been previously instantiated to completion and the process has not been previously executed to completion within the container virtual computing environment.

A fourteenth example is a method of providing increased limitations on privileged container virtual computing environments, the method comprising: instantiating a privileged container virtual computing environment that is separate from a host computing environment on which the privileged container virtual computing environment is instantiated; execute, with a first privilege level, a process within the privileged container virtual computing environment, the process, as part of the execution, performing a first action that modifies a first computing environment aspect, the first action being performable by processes executed with the first privilege level; preventing, by an operating system of the host computing environment, the first action from modifying the first computing environment aspect of the host computing environment; and performing the first action in the container virtual computing environment thereby modifying the first computing environment aspect of the container virtual computing environment such that processes executing within the container virtual computing environment perceive the first action as having been completed but processes executing within the host computing environment perceive the first action as not having been completed; wherein the preventing is based on metadata associated with the container virtual computing environment, the metadata indicating that a second action, performed by processes executing within the container virtual computing environment and modifying a second computing environment aspect, is allowable to be performed to modify the second computing environment aspect of the host computing environment; and wherein the performing the first action in the container virtual computing environment is based on the preventing the first action from modifying the first computing environment aspect of the host computing environment.

A fifteenth example is a system comprising: a first computing device executing computer-executable instructions that implement a first container management system; and a second computing device executing computer-executable instructions that implement a local container manager performing steps comprising: receiving a first container package from the first computing device, the first container package comprising a first container definition file; and receiving a first policy from the first computing device, the first policy affecting when the second computing device instantiates a container virtual computing environment based on the first container package; wherein the second computing device references the first container definition file to determine whether a process executed within the container virtual computing environment is allowed to perform a first action modifying a first computing environment aspect of a host computing environment on which the container virtual computing environment is instantiated.

A sixteenth example is the system of the fifteenth example, wherein the first policy defines preconditions to an instantiation, by the second computing device, of the container virtual computing environment based on the first container package; and wherein further the location container manager performs further steps comprising: providing, upon determining that the preconditions have been met, the first container package to a container creation service executing on the second computing device to instantiate the container virtual computing environment.

A seventeenth example is the system of the fifteenth example, wherein the location container manager performs further steps comprising: performing an idempotency check associated with the container virtual computing environment.

An eighteenth example is the system of the seventeenth example, wherein the idempotency check comprises verifying a certification of idempotency, the first container package comprising the certification of idempotency.

A nineteenth example is the system of the seventeenth example, wherein the idempotency check comprises determining that the container virtual computing environment has not been previously instantiated to completion.

A twentieth example is the system of the fifteenth example, wherein the second computing device executes further computer-executable instructions that perform steps comprising: instantiate the container virtual computing environment; execute, with a first privilege level, the process within the container virtual computing environment, the process, as part of the execution, performing the first action, wherein the first action is performable by processes executed with the first privilege level; prevent, by an operating system of the host computing environment, the first action from modifying the first computing environment aspect of the host computing environment; and perform the first action in the container virtual computing environment thereby modifying the first computing environment aspect of the container virtual computing environment such that processes executing within the container virtual computing environment perceive the first action as having been completed but processes executing within the host computing environment perceive the first action as not having been completed; wherein the performing the first action in the container virtual computing environment is based on the preventing the first action from modifying the first computing environment aspect of the host computing environment.

As can be seen from the above descriptions, mechanisms for providing a fine-grain selectable partially privileged container virtual computing environment have been presented. In view of the many possible variations of the subject matter described herein, we claim as our invention all such embodiments as may come within the scope of the following claims and equivalents thereto.

We claim:

1. A computing device comprising:
a processor; and
memory coupled to the processor, the memory comprising computer-executable instructions that, when executed, perform operations comprising:
executing a process within a container virtual computing environment that is implemented in a host computing environment, wherein the process is executed in accordance with a first privilege level and performs a first action that is intended to modify a first computing environment aspect, the first computing environment aspect being implemented in the container virtual computing environment and the host computing environment;
determining, by a host operating system kernel at the host computing environment, whether the container virtual computing environment is permitted to perform the first action in the host computing environment by querying, by the host operating system kernel, a container creation service at the host computing environment, the container creation service:
having instantiated the container virtual computing environment;
having access to metadata specifying allowable actions of the container virtual computing environment; and
being separate from the host operating system kernel;
determining the container virtual computing environment is not permitted to perform the first action in the host computing environment based on the metadata, the metadata indicating that the process is not permitted to perform the first action to modify the first computing environment aspect of the host computing environment based on the first privilege level;
in response to determining the container virtual computing environment is not permitted to perform the first action in the host computing environment, preventing by the host operating system kernel, the first action from modifying the first computing environment aspect of the host computing environment; and
performing the first action in the container virtual computing environment thereby modifying the first computing environment aspect of the container virtual computing environment such that processes executing within the container virtual computing environment perceive the first action as having been completed but processes executing within the host computing environment perceive the first action as not having been completed.

2. The computing device of claim 1, wherein the preventing the first action from modifying the first computing environment aspect of the host computing environment is performed by the host operating system kernel in a same manner as if the host operating system kernel had determined that the first action is not performable by processes executed with the first privilege level.

3. The computing device of claim 1, wherein the performing the first action in the container virtual computing environment comprises modifying the first computing environment aspect in an overlay layer and storing the modified first computing environment aspect in a sandbox on the host computing environment.

4. The computing device of claim 3, wherein the storing the modified first computing environment aspect in the sandbox comprises recording one or more transactions in the sandbox.

5. The computing device of claim 1, wherein the computer-executable instructions further perform operations further comprising:
upon termination of the container virtual computing environment, performing the first action in the host computing environment, thereby modifying the first computing environment aspect of the host computing environment.

6. The computing device of claim 1, wherein the process performs at least one step of a multi-step transaction comprising other steps, the other steps performed by one or more processes executing within one or more other container virtual computing environments; and
wherein instantiation of the container virtual computing environment is triggered by a transaction manager based on a success of a prior one of the one or more other container virtual computing environments.

7. The computing device of claim 1, wherein the metadata specifies that modifications to files within a first portion of a file system are allowed to be performed on the host computing environment by processes executing within the container virtual computing environment.

8. The computing device of claim 1, wherein the container virtual computing environment is instantiated after determining that enumerated pre-conditions associated with the container virtual computing environment have been met by the host computing environment.

9. The computing device of claim 8, wherein a container package received by the computing device from a remote container management system comprises the enumerated pre-conditions and the metadata associated with the container virtual computing environment.

10. The computing device of claim 1, wherein the container virtual computing environment is selected for instantiation based on policy information received by the computing device from a remote container management system.

11. The computing device of claim 1, wherein the container virtual computing environment is instantiated after performing an idempotency check associated with the container virtual computing environment.

12. The computing device of claim 11, wherein the idempotency check comprises verifying a certification of idempotency associated with the container virtual computing environment.

13. The computing device of claim 11, wherein the idempotency check comprises determining that the container virtual computing environment has not been previously instantiated to completion and the process has not been previously executed to completion within the container virtual computing environment.

14. A method comprising:
executing a process within a privileged container virtual computing environment that is implemented in a host computing environment, wherein the process is executed in accordance with a privilege level and performs an action that is intended to modify a computing environment aspect, a first instance of the computing environment aspect being implemented in the privileged container virtual computing environment and a second instance of the computing environment aspect being implemented in the host computing environment;
determining, by a host operating system kernel of the host computing device, the privilege level does not allow the action to modify the second instance of the computing environment aspect by querying, by the host operating system kernel, a container creation service having instantiated the container virtual computing environment, the container creation service being implemented in the host computing environment separately from the host operating system kernel and having access to a container definition file implemented in the host computing environment, the container definition file identifying functions or actions the process is permitted to perform in the host computing environment in accordance with the privilege level;
in response to the determining the privilege level does not allow the action to modify the second instance of the computing environment aspect, modifying the first instance of the computing environment aspect in performance of the action based on the privilege level; and
determining whether to persist modifications performed on the first instance of the computing environment aspect in performance of the action by validating whether the modifications introduced instability into the first instance of the computing environment aspect.

15. A system comprising:
a first computing device executing computer-executable instructions that implement a first container management system; and
a second computing device executing computer-executable instructions that implement a local container manager performing steps comprising:
receiving a first container package from the first computing device, the first container package comprising a first container definition file that identifies functions or actions that are permitted to be performed by a process executed at a first privilege level within a container virtual computing environment of the second computing device; and
receiving a first policy from the first computing device, the first policy affecting when the second computing device instantiates the container virtual computing environment based on the first container package;
wherein:
a host operating system kernel of the second computing device queries a container creation service implemented by the second computing device and having instantiated the container virtual computing environment, wherein the container creation service references the first container definition file and transfers corresponding information of the first container definition file to the host operating system kernel to allow the host operating system kernel to determine whether the process is allowed to perform a first action modifying a first computing environment aspect of a host computing environment on which the container virtual computing environment is instantiated, the container creation service being separate from the host operating system kernel, the first computing environment aspect being implemented in the container virtual computing environment and the host computing environment; and
based on determining that the process is not allowed to perform the first action modifying the first computing environment aspect of the host computing environment, the process modifies the first computing environment aspect of the container virtual computing environment.

16. The system of claim 15, wherein the first policy defines preconditions to an instantiation, by the second computing device, of the container virtual computing environment based on the first container package; and
wherein the local container manager performs further steps comprising: upon determining that the preconditions have been met, providing the first container package to the container creation service executing on the second computing device to instantiate the container virtual computing environment.

17. The system of claim 15, wherein the local container manager performs further steps comprising: performing an idempotency check associated with the container virtual computing environment.

18. The system of claim 17, wherein the idempotency check comprises verifying a certification of idempotency, the first container package comprising the certification of idempotency.

19. The system of claim 17, wherein the idempotency check comprises determining that the container virtual computing environment has not been previously instantiated to completion.

20. The system of claim 15, wherein the second computing device executes further computer-executable instructions that perform steps comprising:
instantiate the container virtual computing environment;
execute, with a first privilege level, the process within the container virtual computing environment, the process, as part of the execution, performing the first action, wherein the first action is performable by processes executed with the first privilege level;
prevent, by the host operating system kernel, the first action from modifying the first computing environment aspect of the host computing environment; and
perform the first action in the container virtual computing environment thereby modifying the first computing environment aspect of the container virtual computing environment such that processes executing within the container virtual computing environment perceive the first action as having been completed but processes executing within the host computing environment perceive the first action as not having been completed;
wherein the performing the first action in the container virtual computing environment is based on the preventing the first action from modifying the first computing environment aspect of the host computing environment.

\* \* \* \* \*